United States Patent [19]

Limbach

[11] Patent Number: 5,636,030

[45] Date of Patent: Jun. 3, 1997

[54] OPTICAL METHOD AND APPARATUS FOR MEASURING SURFACE TOPOGRAPHY OF AN OBJECT

[76] Inventor: Douglas C. Limbach, 36981 Montecito Dr., Fremont, Calif. 94536

[21] Appl. No.: 432,058

[22] Filed: May 1, 1995

[51] Int. Cl.$^6$ .............................. G01B 11/10; G02B 26/08
[52] U.S. Cl. ....................... 356/386; 356/376; 356/387; 359/201; 359/226
[58] Field of Search ........................... 356/376, 372, 356/379, 380, 384–387, 428; 359/205, 213, 221, 225, 201, 226, 394, 199; 250/234, 235, 236

[56] References Cited

U.S. PATENT DOCUMENTS

| | | | |
|---|---|---|---|
| 3,765,774 | 10/1973 | Petrohilos | 356/156 |
| 3,879,615 | 4/1975 | Moser | 356/386 |
| 3,880,289 | 4/1975 | Gray | 209/111.7 |
| 3,905,705 | 9/1975 | Petrohilos | 356/160 |
| 4,192,613 | 3/1980 | Hammar | 356/386 |
| 4,198,165 | 4/1980 | Kirchstein | 356/383 |
| 4,406,544 | 9/1983 | Takada et al. | 356/376 |
| 4,417,817 | 11/1983 | Böhme et al. | 356/380 |
| 4,465,937 | 8/1984 | Forbes | 356/376 |
| 4,679,076 | 7/1987 | Vikterlöf et al. | 358/107 |
| 4,693,607 | 9/1987 | Conway | 356/380 |
| 4,705,401 | 11/1987 | Addleman et al. | 356/376 |
| 4,737,032 | 4/1988 | Addleman et al. | 356/376 |
| 4,877,970 | 10/1989 | Minamikawa et al. | 250/560 |
| 4,905,512 | 3/1990 | Hayashi | 73/169 |
| 4,906,098 | 3/1990 | Thomas et al. | 356/386 |
| 5,072,121 | 12/1991 | Jazbec | 250/363.04 |
| 5,142,159 | 8/1992 | Veit et al. | 250/560 |
| 5,251,013 | 10/1993 | Danielson et al. | 356/375 |
| 5,457,537 | 10/1995 | Richter | 356/387 |
| 5,477,371 | 12/1995 | Shajir | 359/213 |

FOREIGN PATENT DOCUMENTS 0321337  12/1989  Japan .......................... 356/387

*Primary Examiner*—Hoa Q. Pham

[57] ABSTRACT

An optical method and apparatus are disclosed for determining characteristics of an object such as its size, shape, position, orientation, cross-sectional area, volume, surface topography and specific volume. The inventive method and apparatus utilize a laser beam which is reflected through a right angle by a multi-faceted mirror. The mirror rotates about its own axis as it orbits around the object to be measured, causing a plurality of rotary scanning beams to sweep inwardly across the object as the mirror orbits. Portions of the scanning beam that are not blocked by the object strike a retroreflective ring positioned around the object and are returned along the beam's incident path to a detector. By associating the corresponding orbital position and rotational orientation of the mirror with the detector signal each time a shadow is created by the object, tangents to the surface of the object can be calculated. The tangents gathered during each orbit can then be assimilated to determine the cross-section of the object in the plane of the mirror's orbit. Changing the relative longitudinal position between the orbiting mirror and the object allows successive cross-sections to be determined and combined to calculate the total surface topography or volume of the object.

20 Claims, 13 Drawing Sheets

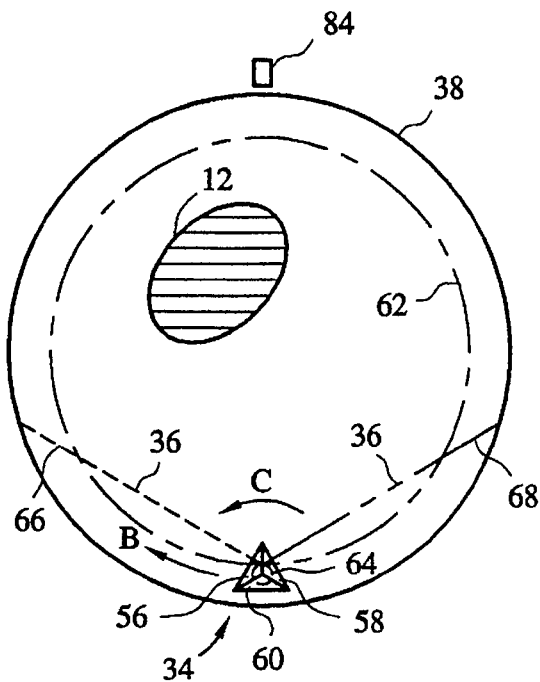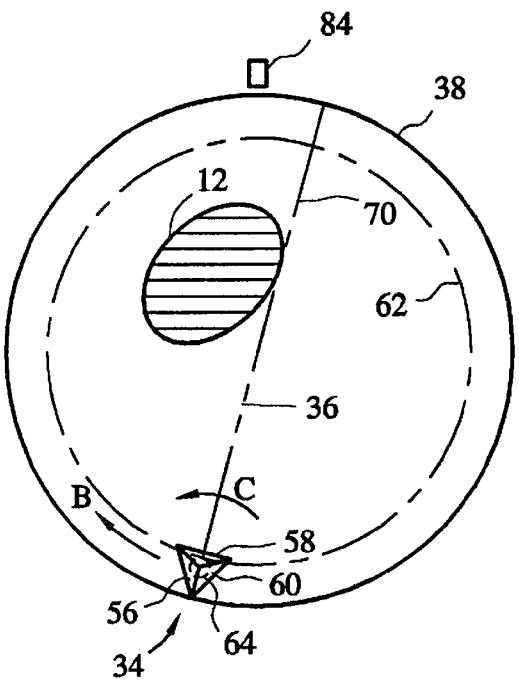
Fig. 3(a)     Fig. 3(b)
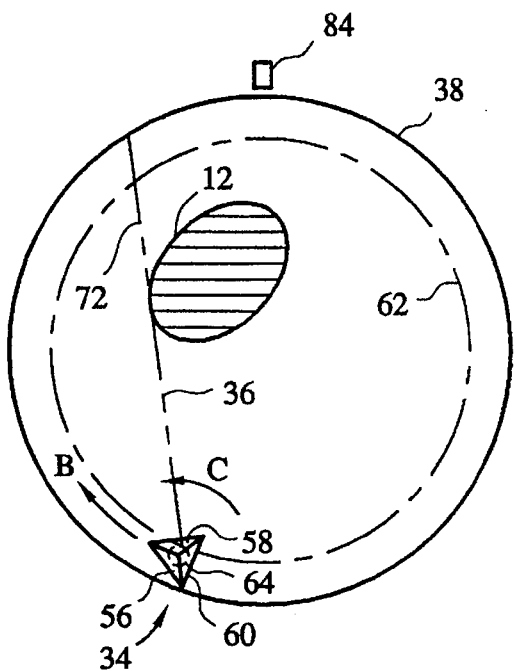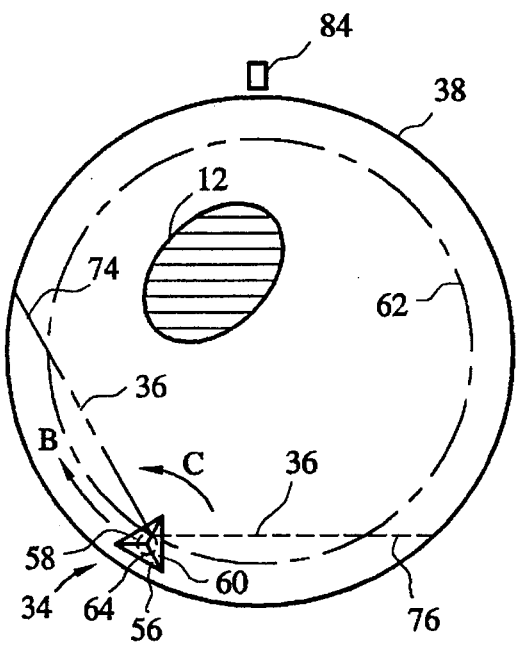
Fig. 3(c)     Fig. 3(d)

OPTICAL METHOD AND APPARATUS FOR MEASURING SURFACE TOPOGRAPHY OF AN OBJECT

BACKGROUND OF THE INVENTION

1. Field of the Invention

The present invention relates to an optical apparatus for measuring surface topography of an object, and in particular to an apparatus which uses the blockage of a coherent light source to measure the relative or absolute size, shape, position, orientation, cross-sectional circumference or area, volume, surface topography, or specific volume (percent body fat) of a human body or other object.

2. Discussion of the Prior Art

There are an enormous number of applications in which it is desirable to have a non-contact method of measuring the contours of a body or object. Examples of some of these applications and their prior art solutions can be found in U.S. Pat. Nos. 4,406,544, 4,679,076, and 5,072,121 (measuring the human body for various-medical purposes), 3,880,289 and 4,693,607 (measuring vegetables and fruit for sorting), and 3,905,705, 4,192,613, 4,198,165, 4,417,817, 4,877,970, 4,905,512, and 5,142,159 (measuring various objects for industrial purposes.) These methods and apparatuses have limited uses and have drawbacks such as excessive size, complexity, cost, and measurement time.

There are other applications in which the measurement of contours or volume is not performed, but would be if more practical. For example, when a person is dieting to improve his or her appearance and wishes to "lose weight", losing volume is actually what that person is most concerned with. The measure of weight has only been used because it has been much more accurate, practical and inexpensive to measure one's weight than one's volume with traditional measurement methods. The measurement of one's volume is actually a better indicator of diet progress, and has the advantage of indicating exactly how much fat, muscle, water, etc. is being gained or lost in particular areas of the body. "Body builders" and those dieting strictly for health reasons are also concerned with volume. These people, as well as traditional dieters, are concerned with adding muscle and losing fat. Accurately measuring the percentage of body fat on a person involves measuring both weight and volume. Percent body fat is a variation of specific volume, which is the volume measured per unit of weight. Traditional methods of measuring a person's volume for this purpose involve measuring water displacement or a person's weight while he or she is submerged under water. Other methods of approximating the amount of body fat include pinching different areas of a person with special calipers to measure the thickness of the flesh. These methods are complicated, inconvenient, and not always very accurate. If the measurement of body volume and body fat were more accurate, convenient, and less expensive, more people might be inclined to take these measurements more often.

Measuring external body changes during pregnancy may be another area that could benefit from an improved measuring system. Currently, weight gain is often tracked during pregnancy, but unless the physician is also using a tape to measure various circumferences of the woman's body, a weight measurement provides very little information as to what type and where the weight is being gained. In other words, it is difficult to accurately determine whether a particular increase in weight is due to retained water, the addition of fat, an increase in the mass of the fetus, and/or some other factor.

Chiropractic care is another area in which accurately measuring the surface topography of the human body would be beneficial. Currently, gauges, scales and other special equipment are used to measure body alignment. This equipment is often complicated and time consuming to use, producing inaccurate results. X-rays are used to locate the skeletal structure more accurately, but taking x-rays, developing the film, and interpreting the results are also difficult and time consuming. X-ray equipment is expensive, and problems associated with over-exposing a patient to x-rays prevents this technology from being used more frequently.

Industrial and commercial areas that would benefit from an improved method of measuring objects include industries that scan objects for computer aided design, analysis and manufacturing work (CAD/CAM and Finite Element Analysis), prototyping and replicating with stereo lithography, and building large stage props, models or virtual reality data bases. Custom clothing industries could measure and transmit accurate information about a client's shape and size. Water content and volume of poultry or produce could be readily measured in the field. There are also countless quality control and sorting tasks that could take advantage of an improved surface measurement device.

Referring to FIG. 1, an example of the shortcomings of prior art measuring devices can be seen by considering one of the patents listed above. U.S. Pat. No. 3,905,705, entitled OPTICAL MEASURING APPARATUS, discloses a laser device for measuring dimensions on small objects, and which has been successfully commercialized by Techmet Company of Dayton, Ohio. According to the prior art invention, a laser beam is reflected off of a rotating mirror to produce a rotary scanning light beam. The rotary scanning beam passes through a converging lens to create a parallel scanning light beam. The parallel scanning light beam then passes through a second converging lens which focuses the scanning beam onto a photo-detector. When an object to be measured is placed in the parallel scanning light beam between the two lenses, it creates a shadow on the detector during a portion of the beam's scan. By measuring the duration of this shadow, the thickness of the object can be determined.

The prior art device is easy to use, quick, highly accurate, and makes a non-contact measurement using relatively few parts. However, the size of the object that can be measured is limited by the size of the two lenses, which must be larger than the object. The device also is only able to measure one dimension of the object. To measure the entire surface of a large object, such as a human body, the diameter of the two lenses would have to be greater than the width of the person, and the entire apparatus would have to rotate around the person and also traverse the height of the person. (The proposed apparatus would have the scanning beam in a horizontal plane, rather than in a vertical plane as shown in FIG. 1.) Alternatively, the person could be rotated while being raised through the parallel scanning beam. Either way, the proposed apparatus would be prohibitively large, slow and expensive. Other prior art devices have similar shortcomings, such as excess cost and complexity.

What is needed, and is not provided by the prior art, is a relatively simple and cost effective, non-contact measuring device that can quickly and conveniently measure the surface topography of an object, large or small.

SUMMARY OF THE INVENTION

The present invention is directed to an optical measuring apparatus which provides all of the above desirable features and advantages while remaining inexpensive to construct and use.

In accordance with a first embodiment of the present invention, the optical measuring device generally includes a coherent light source, such as a laser, which remains in a stationary position. The light source generates a beam which is reflected at a right angle by a beam splitter. This reflected beam strikes a rotating mirror on the mirror's axis of rotation. The rotating mirror is angled at 45° so that the beam is reflected again at a right angle, thereby producing a rotary scanning beam which continuously scans 360°. The rotary scanning beam is reflected again at a right angle by a revolving mirror attached by an arm to the rotating mirror, thereby converting the rotary scanning-beam into a cylindrical scanning beam. The cylindrical scanning beam then strikes a multi-faceted mirror which orbits the object being measured in synchronization with the cylindrical scanning beam. The cylindrical scanning beam is reflected inwardly at a right angle by the multi-faceted mirror. Because the multi-faceted mirror rotates as it orbits around the object being measured, a rotary scanning beam is repeatedly scanned across the object from all sides.

The portions of each scan that are not blocked by the object being measured strike a retroreflective ring which encircles the object. The retroreflective ring returns the scanning beam along its incident path back to the beam splitter. The returning beam passes through the beam splitter and is focused by a lens onto a photodetector. By measuring the duration of the shadow created by the object during each scan, and by associating the shadow in each scan with a corresponding orbital position and rotational orientation of the multi-faceted mirror, the cross-section of the object lying in the plane of the scanning beam can be determined. Successive cross-sections are measured in this fashion by moving the multi-faceted mirror and retroreflective ring longitudinally along the object. The successive cross-sections can then be geometrically combined to determine the entire surface topography of the object.

As there are no large optics, cameras or arrays of detectors as found in much of the prior art, the present invention is simple, compact and relatively inexpensive. The detector need only sense whether the light beam is blocked or unblocked. Since there are no special requirements for lighting or surface reflectivity of the object being measured, any opaque object can be measured reliably. In the present invention, the object remains stationary while being measured and only a pair of mirrors and a multi-faceted mirror revolve. Therefore, the rate of revolution can be very high and the scanning can be performed quickly.

In accordance with a second embodiment, the present invention is used to measure long or continuous length objects, such as industrial extrusions, webs, cables, air craft rotor blades or timber. This second embodiment is essentially identical to the first but with two major differences. First, the multi-faceted mirror and retroreflective ring are longitudinally fixed while the object to be measured is moved through an off-center portion of the retroreflective ring. Second, there is no arm connecting the revolving mirror to the rotating mirror. Instead, the revolving mirror is positioned directly adjacent to the multi-faceted mirror and orbits therewith around the object.

Other features and advantages of the invention will be apparent from the following description, the accompanying drawings and the appended claims.

BRIEF DESCRIPTION OF THE DRAWINGS

FIG. 3 is a partial plan view of FIG. 2 showing the progression of a representative sweep of scanning beam 36 across object 12, where:

(a) shows the initial beam 68 of the sweep;

(b) shows the leading beam 70 of the sweep;

(c) shows the trailing beam 72 of the sweep; and (d) shows the final beam 74 of the sweep.

Figure 4:
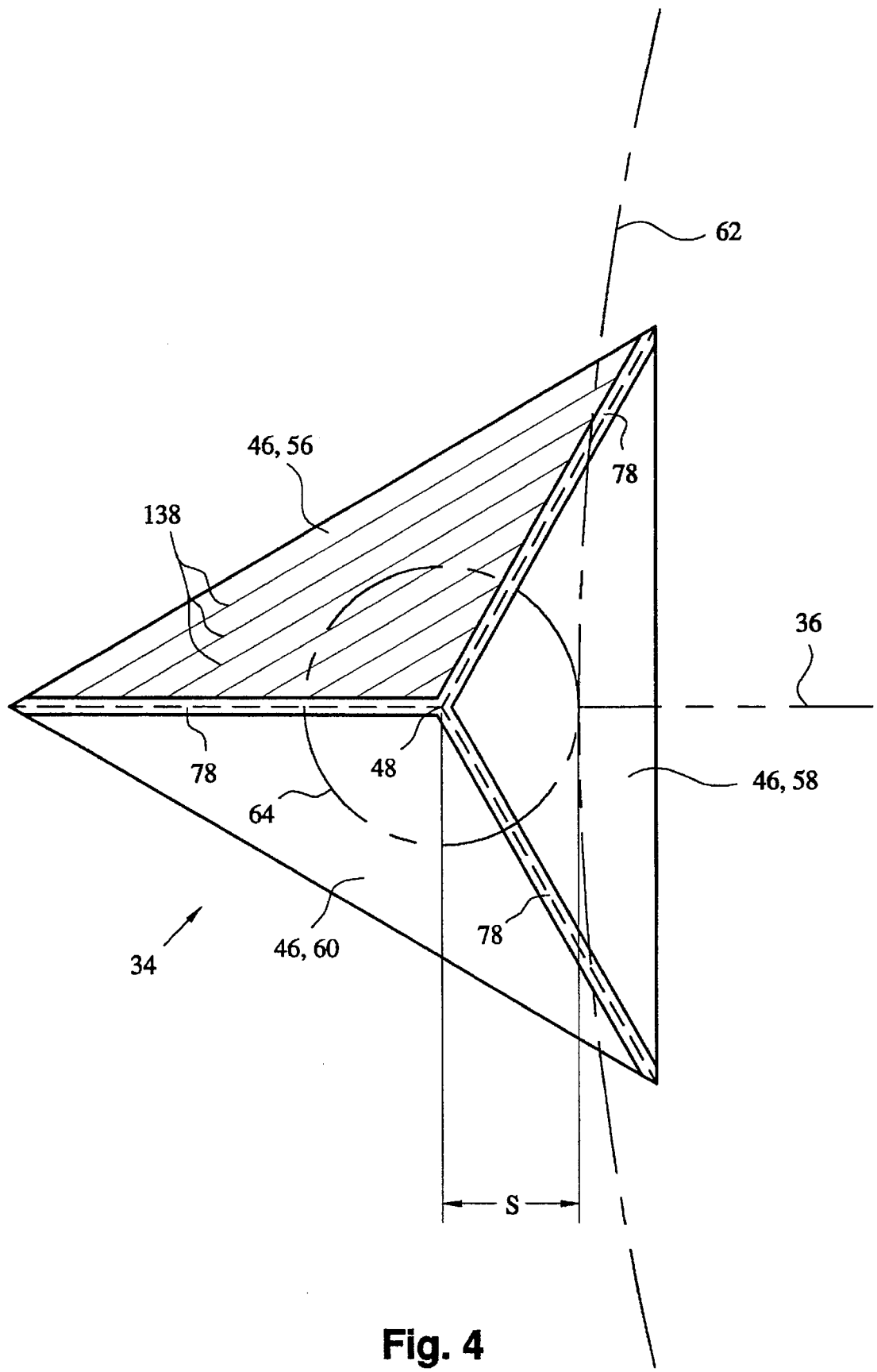

FIG. 4 is an enlarged plan view of the orbiting mirror 34.

Figure 5:
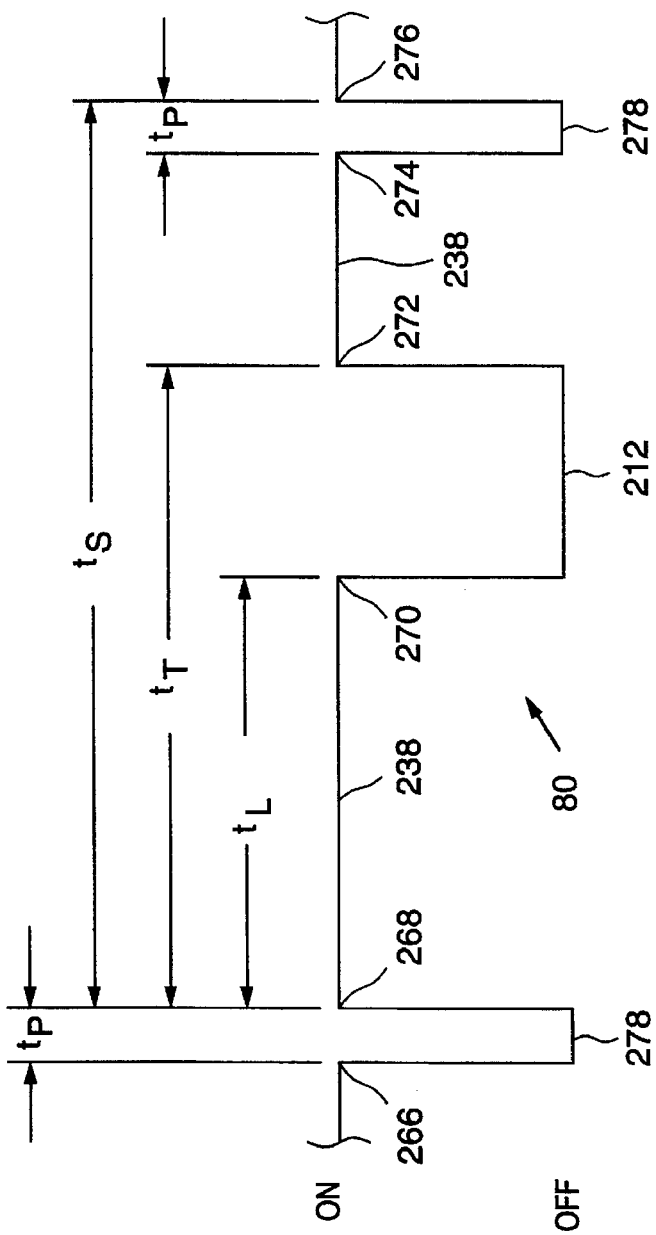

FIG. 5 is a diagram showing an ideal electrical signal 80 corresponding to the representative sweep shown in FIG. 3.

Figure 6:
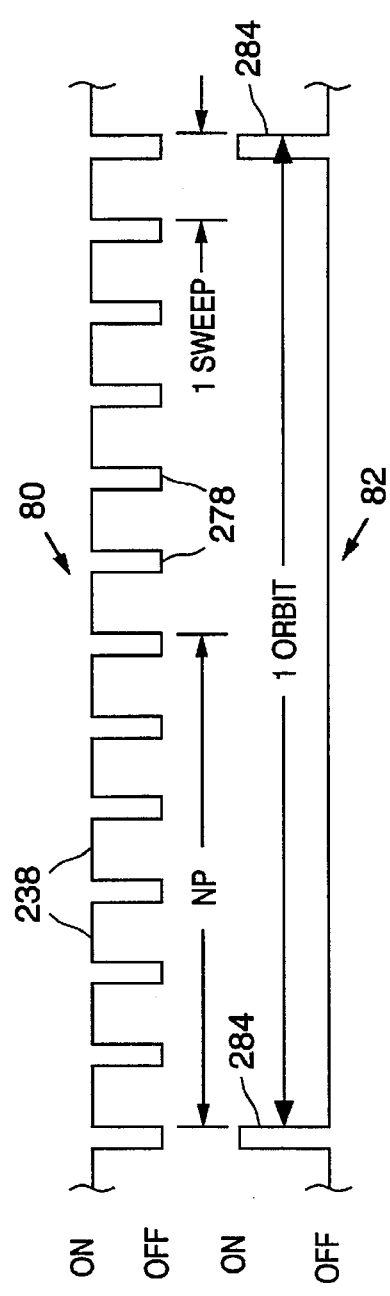

FIG. 6 is a diagram showing the timing pulses 278 of ideal electrical signal 80 and the trigger pulses 284 of signal 82.

Figure 7:
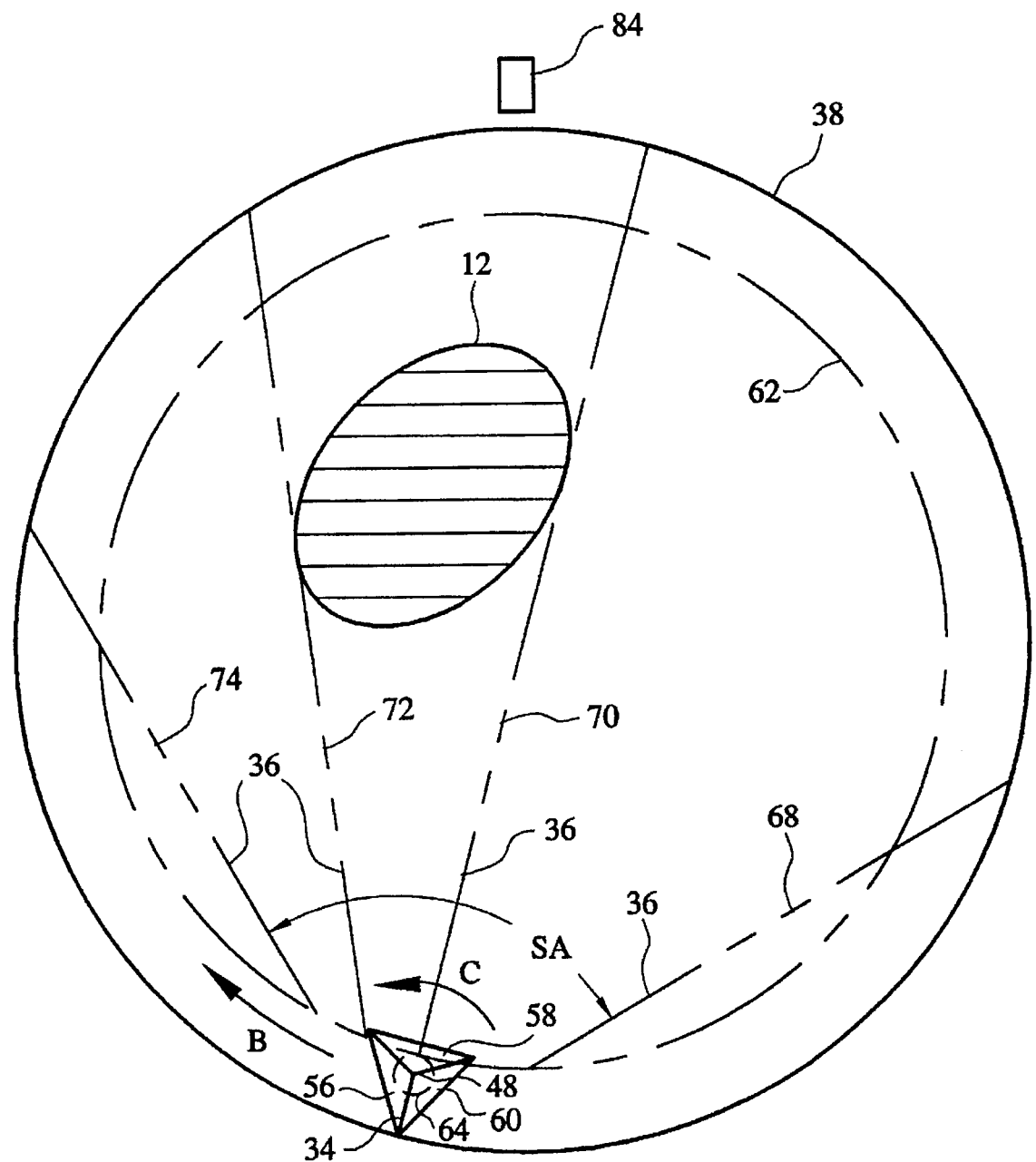

FIG. 7 is an enlarged view of FIG. 3(b), and also shows the other phases of scanning beam 36 during the representative sweep.

Figure 8:
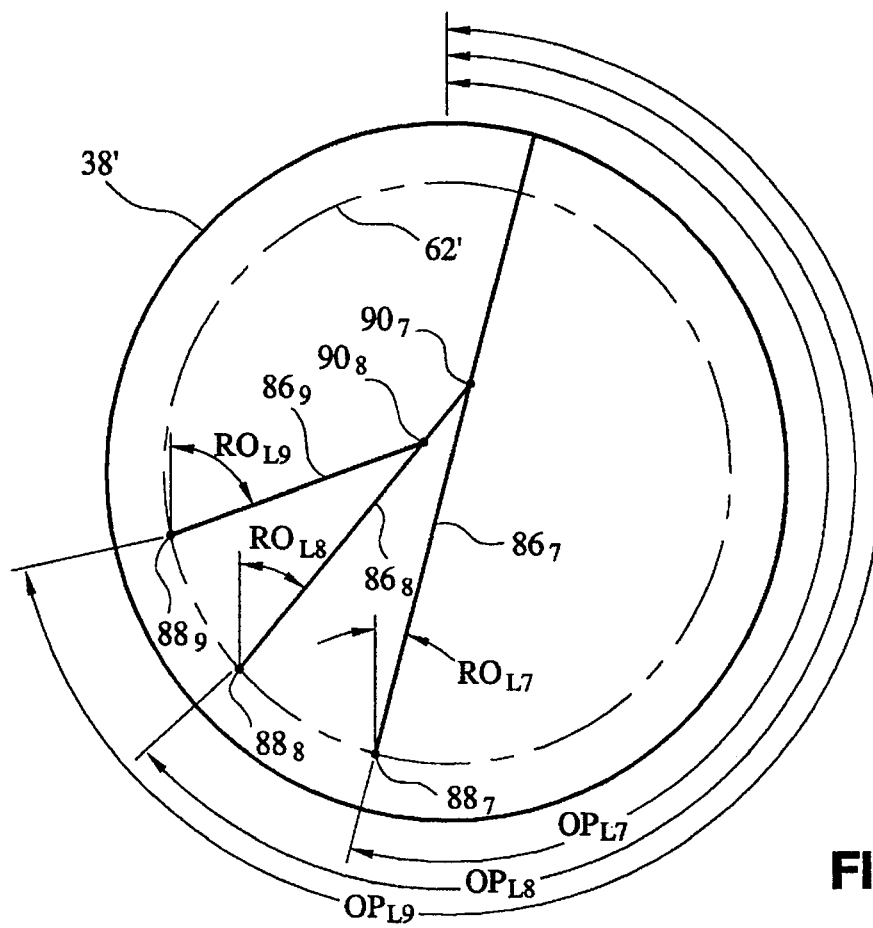

FIG. 8 is a diagram showing the beginning of how a scanned cross-section of object 12 is reconstructed geometrically from the scan information.

Figure 9:
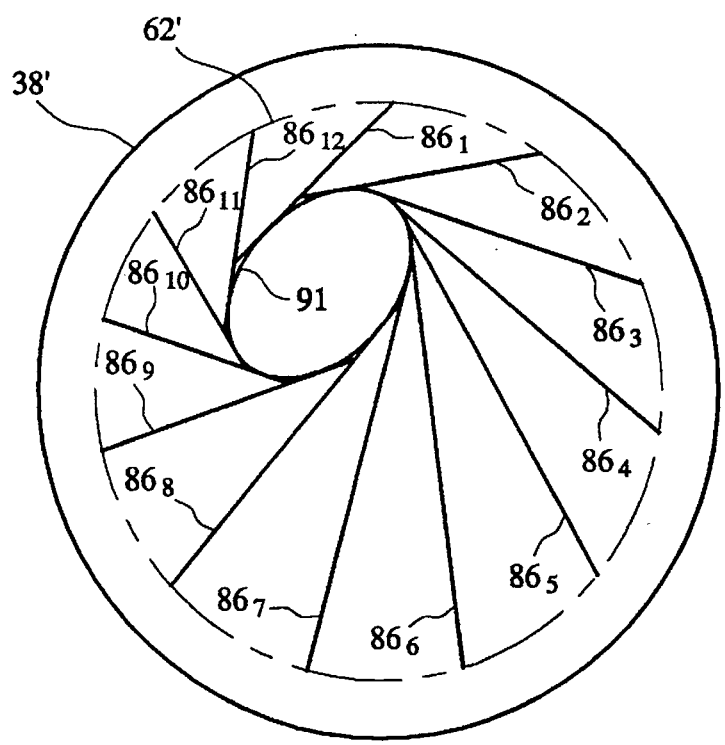

FIG. 9 is a diagram showing how a scanned cross-section is reconstructed geometrically from the scan information.

Figure 10:
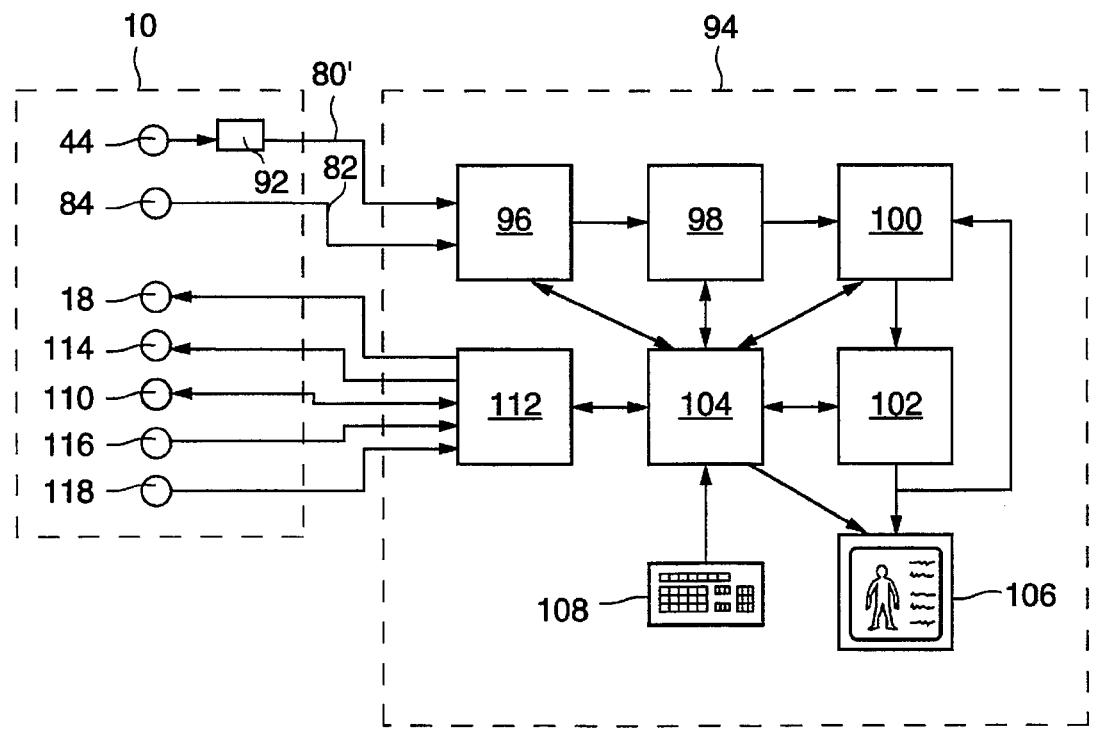

FIG. 10 is a schematic diagram of the electrical and software portions of the preferred embodiment.

Figure 11:
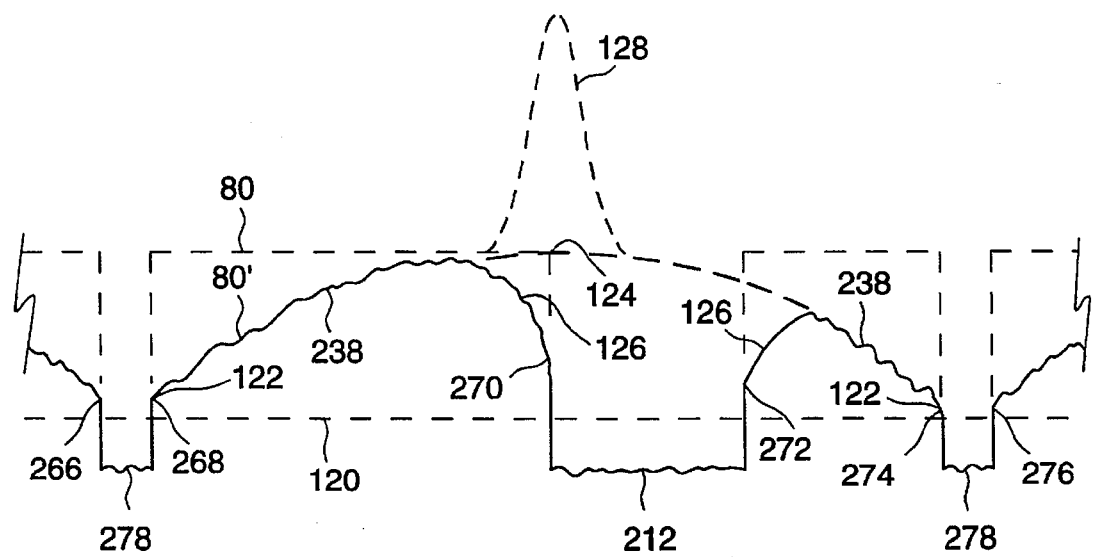

FIG. 11 is a diagram showing an actual or non-ideal electrical signal 80' corresponding to FIG. 5.

Figure 12:
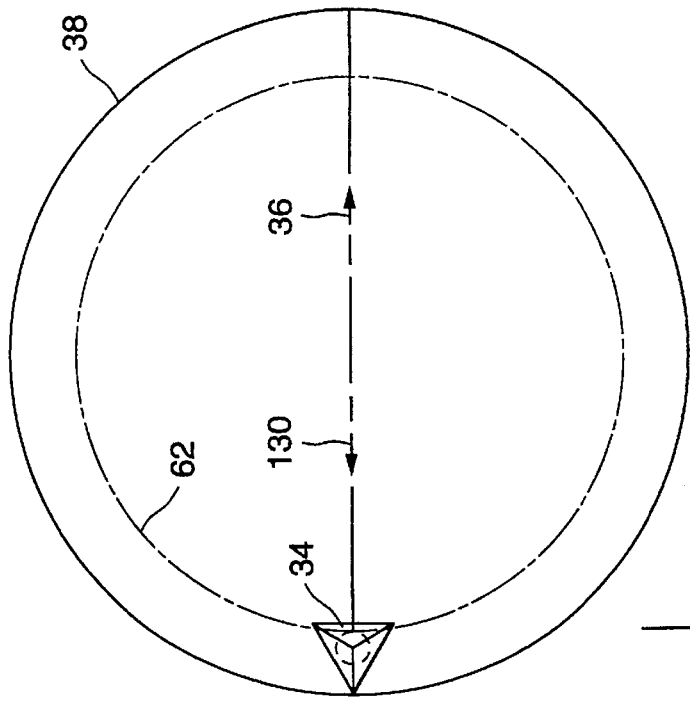

FIG. 12 is a plan view of scanning beam 36 showing supplemental reflection 130 being deflected away from orbiting mirror 34.

Figure 13:
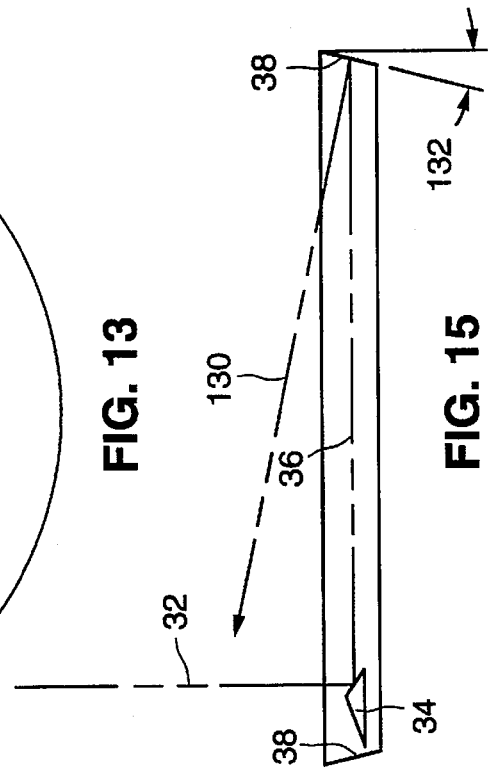

FIG. 13 is a plan view of scanning beam 36 showing supplemental reflection 130 being reflected back to orbiting mirror 34.

Figure 14:
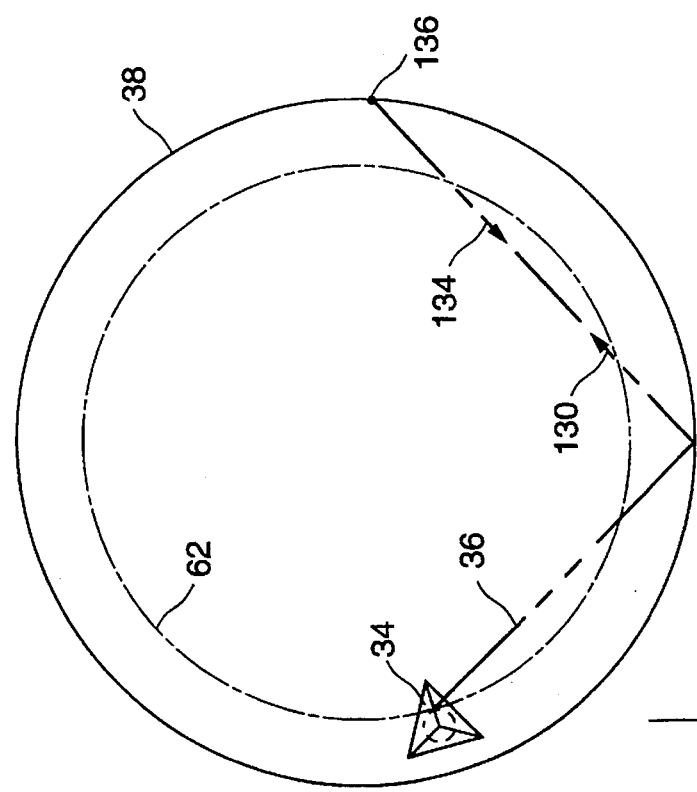

FIG. 14 is a side elevation view of scanning beam 36 showing supplemental reflection 130 being reflected back to orbiting mirror 34.

Figure 15:
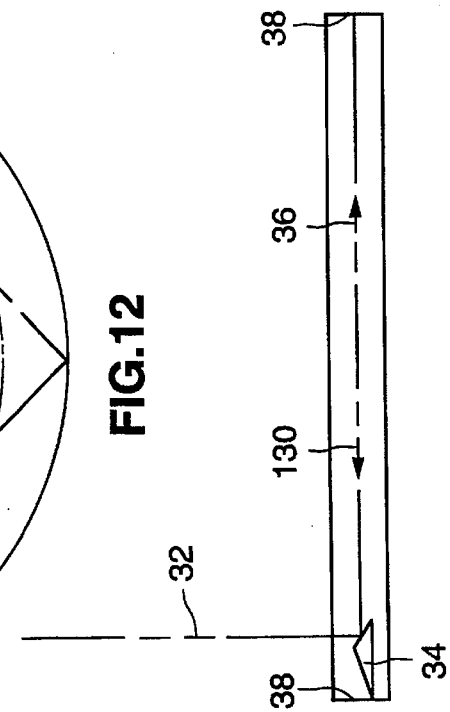

FIG. 15 is a side elevation view of scanning beam 36 showing supplemental reflection 130 being deflected away from orbiting mirror 34.

Figure 16:
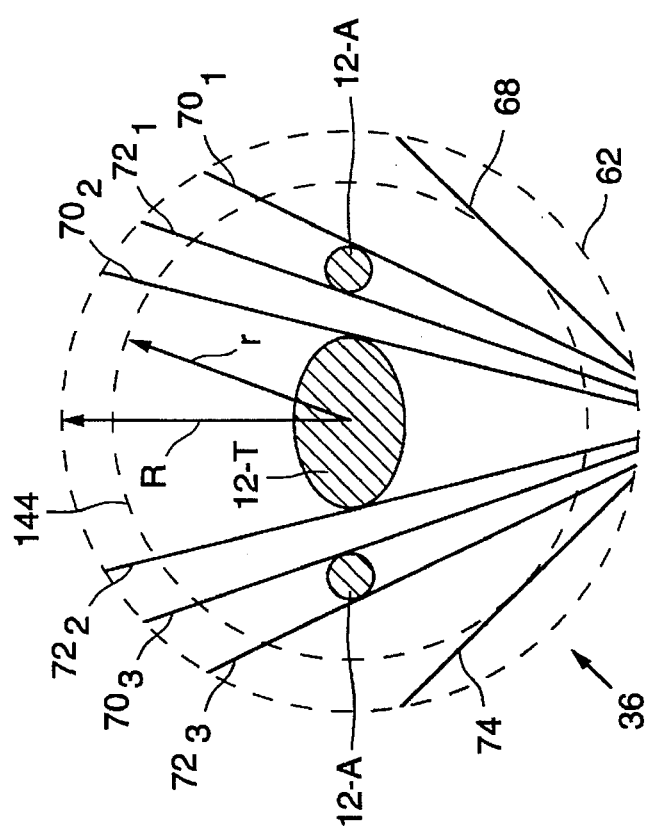

FIG. 16 is a plan view of scanning beam 36 making a representative sweep across a discontinuous cross-section of object 12.

Figure 17:
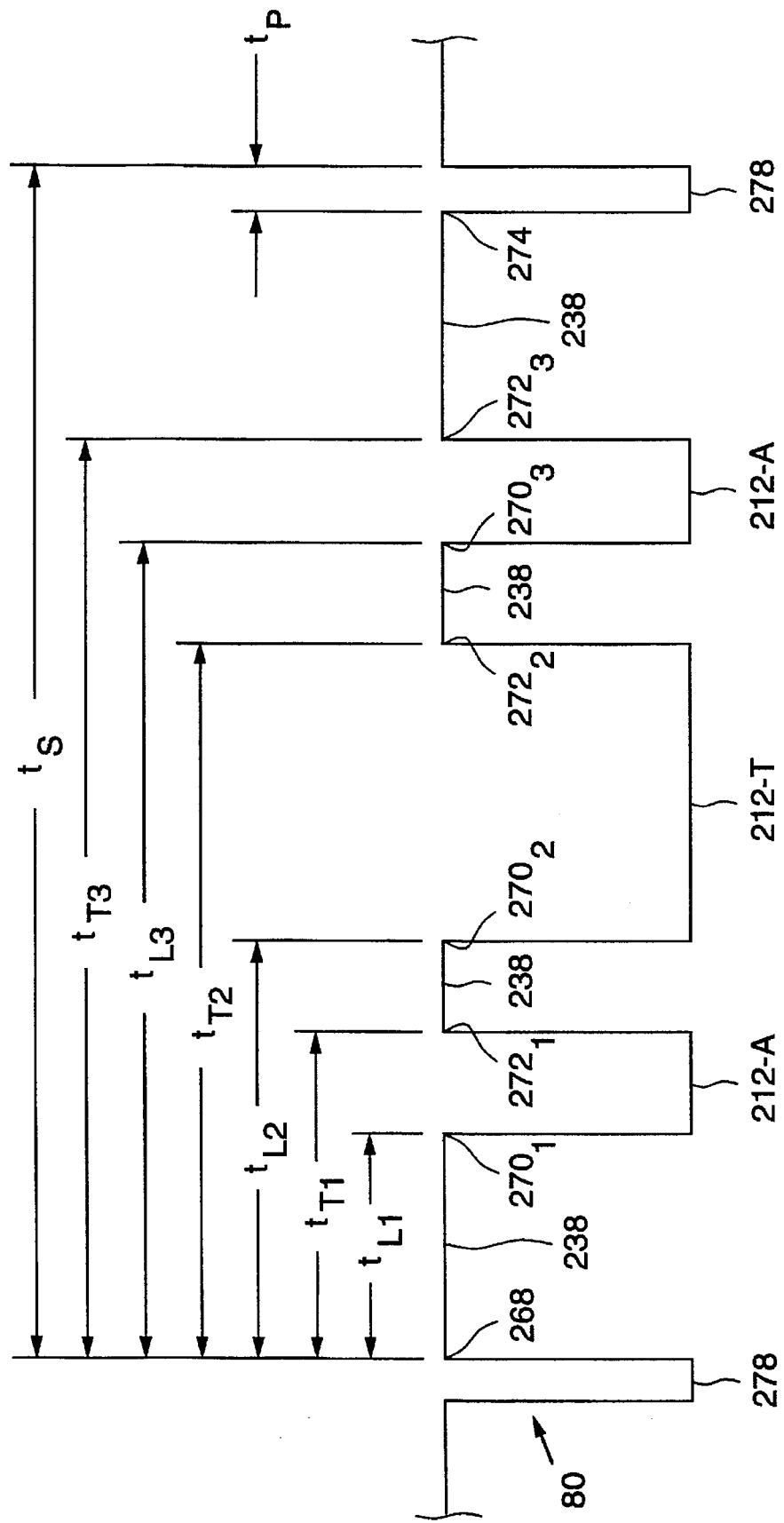

FIG. 17 is a diagram showing an ideal electrical signal 80 corresponding to the representative sweep shown in FIG. 16.

Figure 18:
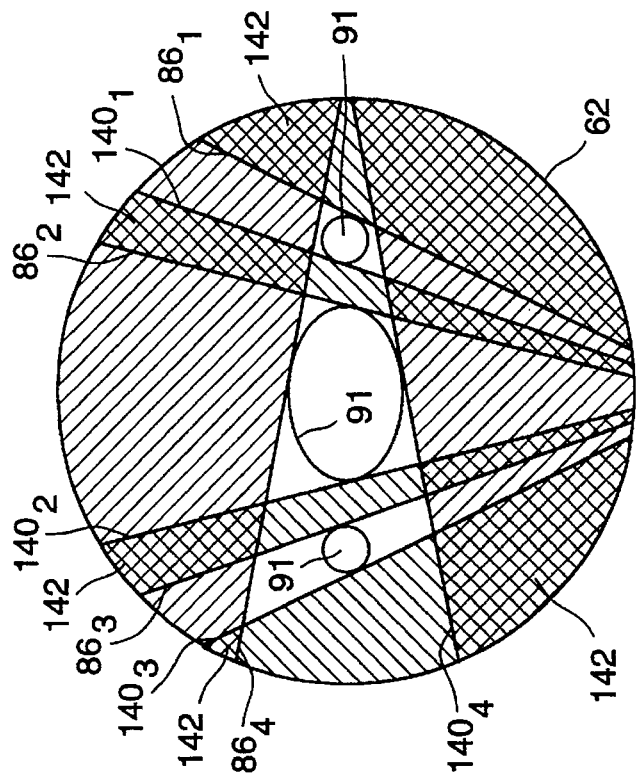

FIG. 18 is a diagram showing how a second method is used to geometrically reconstruct a discontinuous cross-section of object 12 from the scan information.

Figure 19:
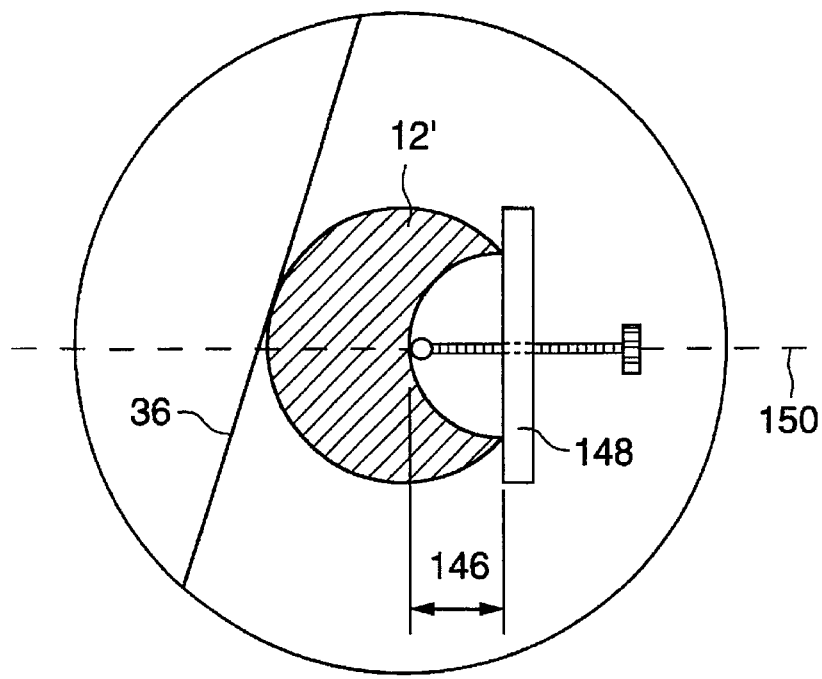

FIG. 19 is a plan view of scanning beam 36 sweeping across a cross-section of object 12' which has a concave portion.

Figure 20:
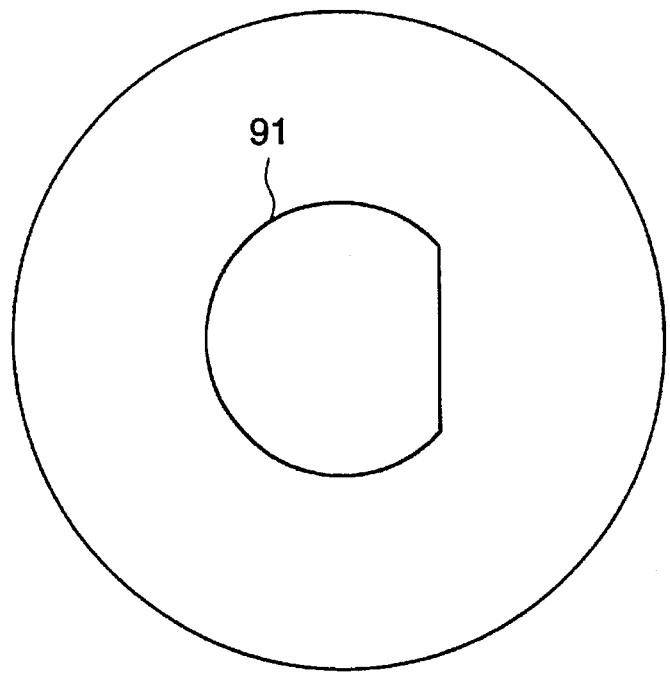

FIG. 20 is diagram showing the initial geometric reconstruction of concave object 12' of FIG. 19.

Figure 21:
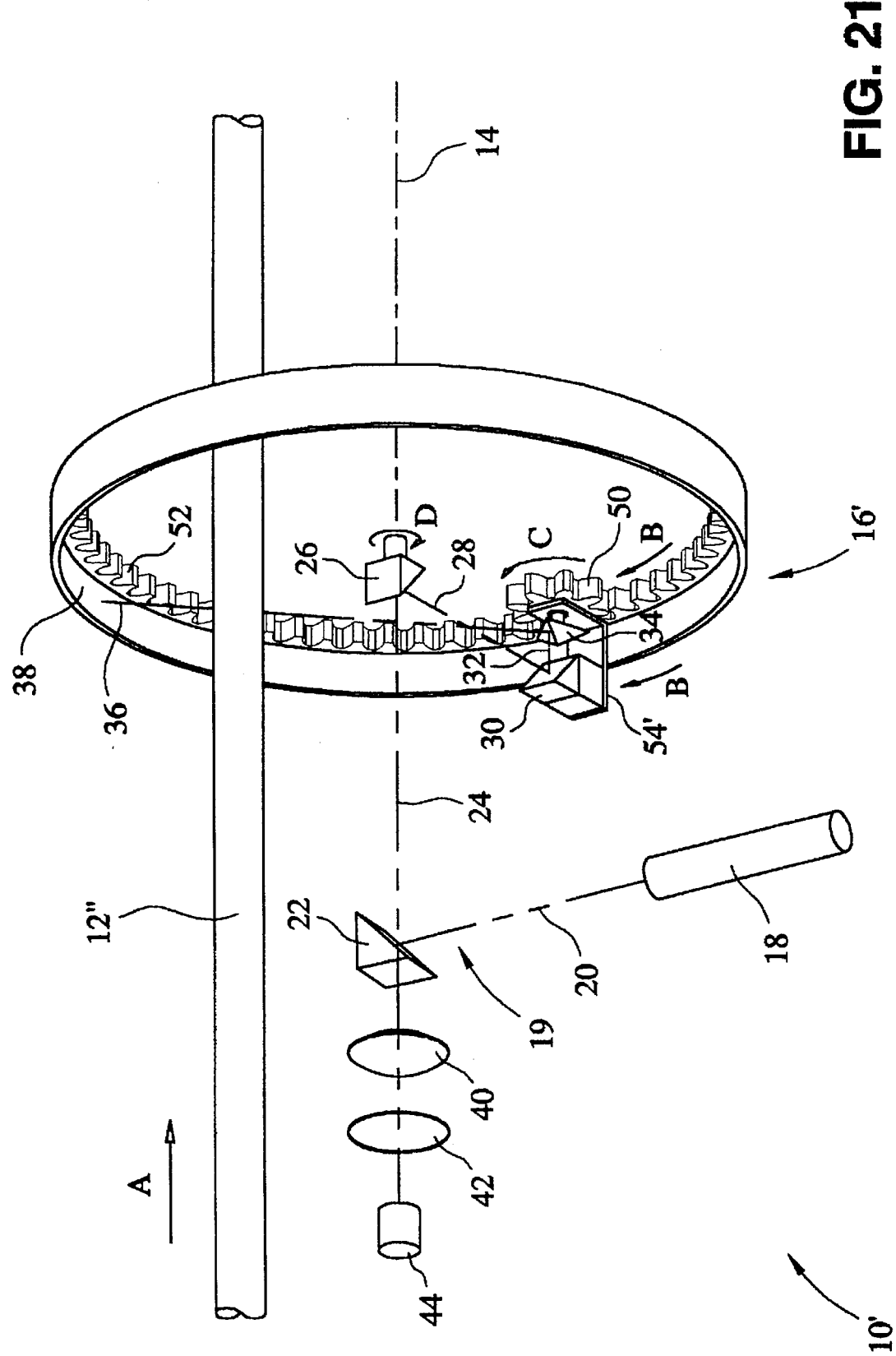

FIG. 21 is a perspective view schematically showing the opto-mechanical portion 10' of a second embodiment of the present invention.

DETAILED DESCRIPTION OF THE PREFERRED EMBODIMENT

Figure 1:
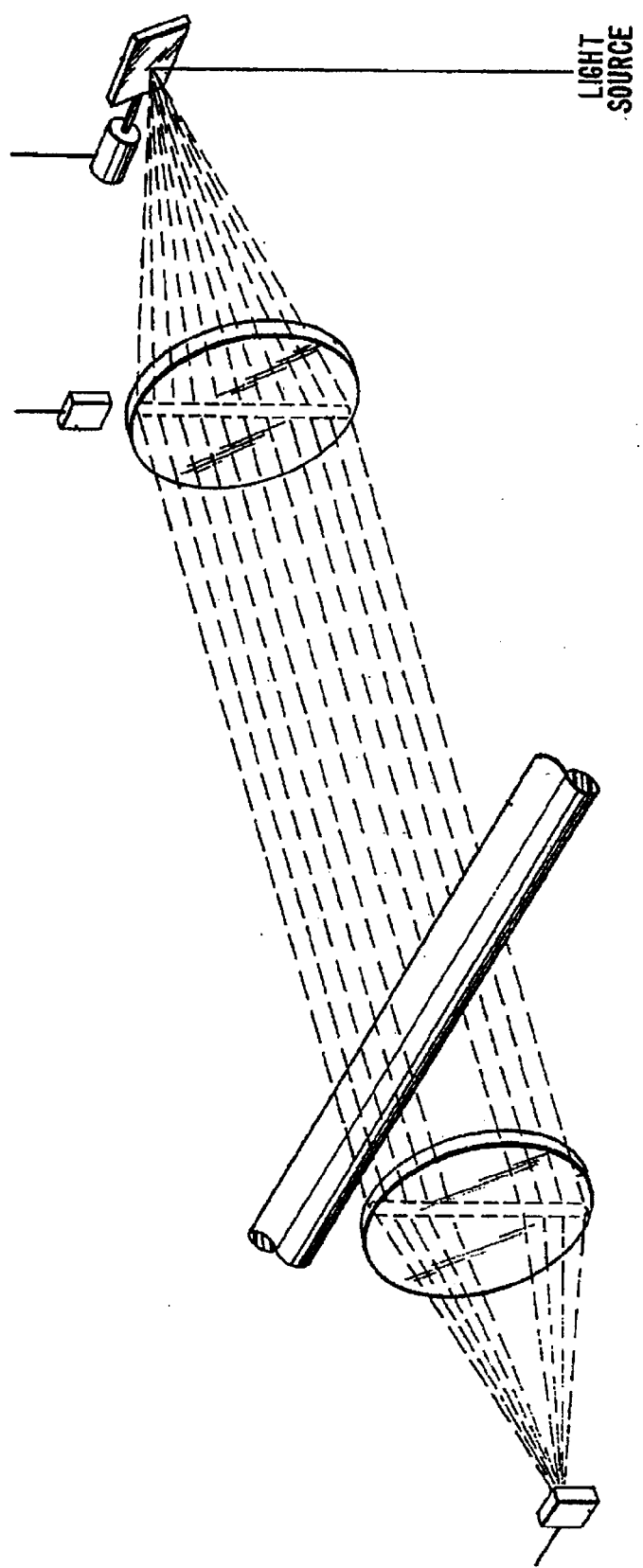
FIG. 1 is a perspective view showing a prior art optical measuring apparatus, which is the subject of U.S. Pat. No. 3,905,705.
Figure 2:
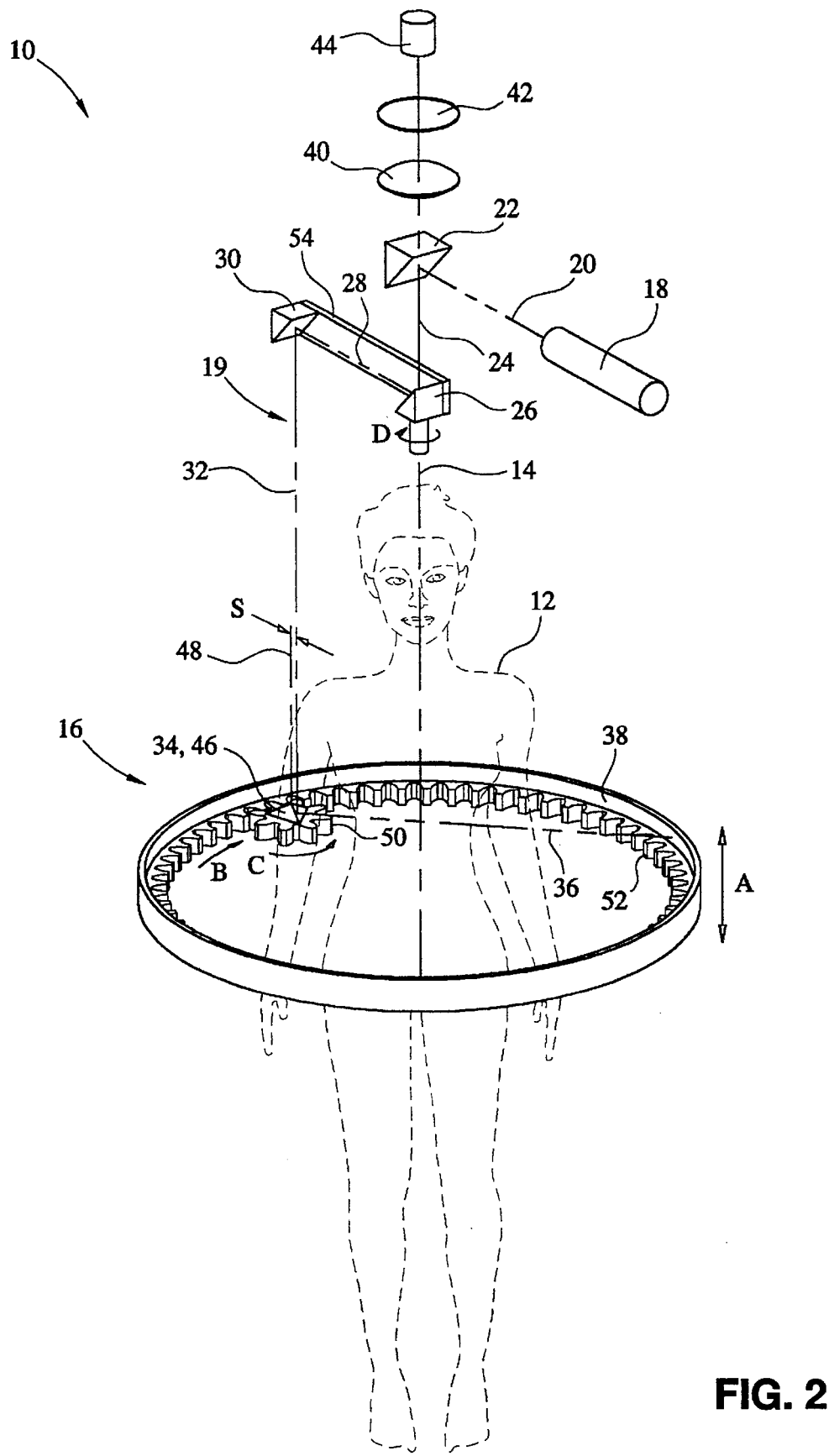
FIG. 2 is a perspective view schematically showing the opto-mechanical portion 10 of a first embodiment of the present invention.

Referring to FIG. 2, the basic arrangement of the opto-mechanical portion 10 of a first embodiment of the invention will be described. In this first embodiment, the object 12 whose surface is to be measured remains stationary. Object 12 is placed in a vertical orientation, generally aligned with the central axis 14 of the opto-mechanical portion 10 of the apparatus. Ring assembly 16 is of sufficient diameter to encircle object 12 and is vertically moveable as shown by arrow A, preferably able to traverse a distance longer than the length of object 12.

A beam generator 18, such as a 1 milliwatt helium-neon laser, is mounted in a stationary, horizontal position above object 12, and produces a beam, which is shown by phantom line and is generally referred to by reference numeral 19. A horizontal source beam 20 is emitted from beam generator 18 and is reflected downward 90° by beam splitter 22 to form a vertical axis beam 24 along central axis 14. Axis mirror 26 reflects axis beam 24 outward 90° to produce a horizontal radial beam 28. Tracking mirror 30 reflects radial beam 28 downward 90° to produce a vertical tracking beam 32. Orbiting mirror 34 reflects tracking beam 32 inward 90° to form a horizontal scanning beam 36. Scanning beam 36 strikes a retroreflective surface 38 located along the inside circumference of ring assembly 16. Retroreflective surface 38 returns beam 19 along its incident path to beam splitter 22. Returning axis beam 24 passes through beam splitter 22, through lens 40, through optical bandpass filter 42, and is received by detector 44. Lens 40, such as a fresnel lens, counteracts the effects of beam spread by focusing the returning axis beam 24 onto detector 44. Filter 42 blocks unwanted ambient light and stray reflections by only passing light having a frequency near that of beam generator 18 (632.8 nanometers produced by a helium-neon laser in the preferred embodiment). Detector 44 is "ON" and produces an electrical signal when struck by the returning axis beam 24, and is "OFF" when scanning beam 36 is blocked by object 12.

Orbiting mirror 34 preferably has a plurality of identical facets 46 arranged around its circumference. Each facet 46 is oriented at a 45° angle to the vertical axis 48 of orbiting mirror 34 to form a pyramid. Preferably, there are three facets 46, as depicted in FIG. 2. However, any number of facets can be used, including a single facet (i.e. a 45° mirror with a vertical axis through the center of its face). Orbiting mirror 34 travels around the inside circumference of ring assembly 16, as shown by arrow B. As orbiting mirror 34 travels in a circular path, it is forced to rotate about its axis 48 by pinion 50, as shown by arrow C. Pinion 50, coaxially attached to orbiting mirror 34, has teeth which engage complementary teeth on internal gear 52, thereby producing rotation in planetary gear fashion as it travels along internal gear 52. Alternatively, pinion 50 and internal gear 52 can be replaced with a toothless roller and a flat cylindrical surface, respectively (not shown).

Tracking mirror 30 is radially connected to axis mirror 26 by tracking arm 54. Tracking arm 54, carrying axis mirror 26 and tracking mirror 30, rotates about central axis 14, as shown by arrow D. Tracking arm 54 rotates in synchronization with pinion 50 so that tracking mirror 30 remains directly above orbiting mirror 34 as it orbits around object 12. Although tracking beam 32 sweeps out a cylindrical shape during rotation, it maintains a fixed relationship with respect to the position of axis 48 of orbiting mirror 34. Preferably, tracking beam 32 is spaced directly radially inward from axis 48, as depicted by the letter S in FIG. 2.

As orbiting mirror 34 rotates about its axis 48 while orbiting, tracking beam 32 alternately strikes each of the facets 46 in turn. The rotation of each facet 46 about axis 48 causes scanning beam 36 to sweep horizontally across object 12, as shown by arrow C. A sweep is generated each time one of the facets 46 passes under tracking beam 32 (three times per rotation of orbiting mirror 34 in this preferred embodiment).

Preferably, scanning beam 36 is unblocked by object 12 at the beginning and end of each sweep. During each sweep, detector 44 detects when scanning beam 36 becomes blocked by object 12 and when it becomes unblocked. For each change of state of scanning beam 36 between being blocked and unblocked, the corresponding orbital position and rotational orientation of orbiting mirror 34 can each be determined, as will be fully described below. For an object 12 having a contiguous cross-section, this defines for each sweep a pair a lines that are tangent to opposite sides of object 12. As orbiting mirror 34 makes a complete orbit around object 12, a plurality of sweeps are performed, each sweep generating a pair of tangents. All of the tangents gathered during one orbit can be combined to determine the lateral cross-section (the horizontal cross-section in this embodiment) of object 12 lying in the plane swept out by scanning beam 36.

Ring assembly 16, which includes orbiting mirror 34, retroreflecting surface 38, pinion 50, and internal gear 52, is moved longitudinally (vertically in this embodiment), as shown by arrow A, to generate successive lateral cross-sections which can be combined to determine the overall volume or surface topography of object 12. Ring assembly 16 can be moved incrementally after each cross-section is completed. Alternatively, ring assembly 16 can be moved continuously so that orbiting mirror 34 follows a helical path.

Referring to FIGS. 3(a) through 3(d), a single sweep of object 12 by scanning beam 36 will be described. The first, second and third facets 46 of orbiting mirror 34 are designated with the numerals 56, 58 and 60, respectively. The sweep of scanning beam 36 shown in FIGS. 3(a) through 3(d) is generated by second facet 58.

As tracking beam 32 (not shown) follows orbiting mirror 34 around a circular path, it traces out a tracking beam path 62. As orbiting mirror 34 rotates about its axis 48, it is struck by tracking beam 32 along a relative path 64. Although tracking beam 32 cannot be seen in FIGS. 3(a) through 3(d) because it is vertical, it is located at the intersection of tracking beam path 62 and relative path 64.

Referring to FIG. 3(a), final beam 66 of the previous sweep, shown by a dashed line, is generated by the first facet 56. As the first facet 56 rotates in the direction of arrow C out from under tracking beam 32, it is followed by second facet 58. When tracking beam 32 moves from the first facet 56 to the second facet 58, final beam 66 of the previous sweep disappears and is replaced by initial beam 68. Initial beam 68 moves in the direction of arrow B in response to the orbiting motion of orbiting mirror 34, and simultaneously rotates in the direction of arrow C in response to the rotational motion of orbiting mirror 34.

Referring to FIG. 3(b), scanning beam 36 sweeps in the direction of arrow C while being reflected back along its incident path by retroreflective surface 38. When scanning beam 36 encounters object 12, it is blocked from reaching retroreflective surface 38 and therefore detector 44 (not shown) goes from ON to OFF. In FIG. 3(b), scanning beam 36 is shown as leading beam 70 just before it is blocked by object 12.

Referring to FIG. 3(c), scanning beam 36 continues to be blocked as it sweeps across object 12 in the direction of arrow C. Scanning beam 36 emerges from the opposite side of object 12 as trailing beam 72 and again strikes retroreflective surface 38 to turn detector 44 (not shown) from OFF to ON.

Referring to FIG. 3(d), scanning beam 36 continues to sweep in the direction of arrow C until tracking beam 32 passes from second facet 58 onto third facet 60. FIG. 3(d)

shows final beam 74 as the last beam generated in this sweep. The initial beam 76 of the next sweep is shown by a dashed line. In a similar fashion to that just described, scanning beam 36 repeatedly sweeps in the direction of arrow C across object 12 as orbiting mirror 34 travels in the direction of arrow B around object 12.

Referring to FIG. 4, an enlarged view of orbiting mirror 34 is shown. In the preferred embodiment, non-reflective tape 78 of a consistent, predetermined width is accurately centered on the edges between facets 46. When tracking beam 32 passes from one facet 46 to the next, it is momentarily absorbed by tape 78 and prevented from returning to detector 44 (not shown). By accurately controlling the speed at which orbiting mirror 34 is driven, electrical timing pulses of a known frequency can be created as detector 44 turns OFF between sweeps in response to tracking beam 32 striking tape 78. Alternatively, or in conjunction with accurately controlling the speed of orbiting mirror 34, the spacing S between tracking beam 32 and axis 48 of orbiting mirror 34 can be accurately controlled to produce timing pulses with a known duration and/or a duration that remains constant with respect to the duration of the sweeps of scanning beam 36. The timing pulses allow the orbital position and rotational orientation of orbiting mirror 34 to be determined directly from the electrical signal produced by detector 44, rather than by utilizing expensive encoders and/or highly accurate gears and drive train components.

Referring primarily to FIG. 5, a graph is shown representing an ideal electrical signal 80 produced by detector 44 in response to the example sweep depicted in FIGS. 3(a)–3(d). (Actual signal 80' will be discussed later.) The vertical axis of the graph represents voltage while the horizontal axis represents time. Features in the graph that correspond to specific beams or features shown in FIGS. 3(a)–3(d) are referred to by the same reference numbers incremented by 200.

Signal 80 is ON at the end of the previous sweep (far left portion of signal 80). When tracking beam 32 strikes the tape 78 between the first facet 56 and the second facet 58, the final beam 66 of the previous sweep is extinguished and signal 80 turns OFF at point 266. Signal 80 remains OFF, shown as timing pulse 278, while tracking beam 32 traverses tape 78. When tracking beam 32 emerges from tape 78 onto the second facet 58, initial beam 68 is produced causing signal 80 to turn ON at point 268. Signal 80 remains ON while scanning beam 36 is unobstructed by object 12 and strikes retroreflective surface 38, as depicted by signal segment 238. When leading beam 70 is blocked by object 12 at point 270, signal 80 is turned OFF and remains so during segment 212 until trailing beam 72 emerges at point 272. Again, during another segment 238, signal 80 is ON while scanning beam 36 is unblocked by object 12 and strikes retroreflective surface 38. Signal 80 turns OFF at point 274 when final beam 74 is blocked by tape 78 between the second facet 58 and third facet 60, and remains OFF during timing pulse 278. When the initial beam 76 of the next sweep emerges from the third facet 60 on the other side of tape 78, signal 80 turns ON at point 276 and the above cycle repeats in a similar fashion from point 268.

In order to determine surface locations of object 12 defined by leading beams 70 and trailing beams 72, the corresponding orbital positions and rotational orientations of orbiting mirror 34 are calculated. This is accomplished primarily by determining the exact timing of the segments of signal 80 described in the preceding paragraph. Although many alternative methods can be used to determine this timing and it is not crucial to the invention which method is used, the preferred method will now be described.

Referring to FIGS. 2, 3 and 5, the orbital position of orbiting mirror 34 can be determined by counting the timing pulses 278 shown in FIG. 5. The number of timing pulses 278 created during one orbit of orbiting mirror 34 is equal to the ratio RT of the diameter of internal gear 52 to the diameter of pinion 50, times the number of facets NF on orbiting mirror 34. In the example depicted in FIG. 3, the ratio RT is four. (The relative size of orbiting mirror 34 is drawn as if the ratio RT were the preferred ratio of eight. For clarity, however, the movement of orbiting mirror 34 in the directions of arrows B and C is drawn corresponding to a ratio RT of four.) The number of facets NF is three, and therefore the number of sweeps and timing pulses 278 created per orbit equals twelve. The number of orbital degrees OD covered during each sweep is provided by the following formula:

$$OD = 360°/(RT \times NF)$$

where:

OD = the number of orbital degrees covered by the orbiting mirror 34 during each sweep, RT = the ratio of the diameter of internal gear 52 to the diameter of pinion 50, and NF = the number of facets 46 on orbiting mirror 34.

In the example of FIG. 3, the number of orbital degrees OD equals 30°.

Referring to FIG. 6, a second electrical signal 82 can be created from a sensor 84 (depicted in FIG. 3) that produces one trigger pulse 284 every orbit. For example, sensor 84 can be positioned such that the falling edge of trigger pulse 284 occurs when orbiting mirror 34 reaches the 12 o'clock in FIG. 3. Preferably, the ratio RT times the number of facets NF results in a whole number, so that synchronization between the timing pulses 278 and trigger pulses 284 can be maintained. This second signal 82 is particularly important if teeth are not used on pinion 50 and internal gear 52, as errors due to slippage may accumulate over a number of orbits, thereby making the determination of orbital position inaccurate.

The position of orbiting mirror 34 at the start of each sweep can be referenced to the twelve o'clock position by counting timing pulses 278 on signal 80. (For clarity, only the timing pulses 278 are shown on first signal 80 in FIG. 6.) In this example, six sweeps have occurred between the trigger pulse 284 at the 12 o'clock position and the start of the seventh sweep shown in FIG. 3(a) at the 6 o'clock position (12 sweeps per revolution times one half of a revolution.) The initial orbital position IOP at the beginning of this seventh sweep is the number of timing pulses NP since the trigger pulse 284, times the orbital degrees OD covered by each sweep. In this example, the initial orbital position IOP is 6 times 30°, or 180°. This is conveyed by the following formula:

$$IOP = NP \times OD$$

where:

IOP = the initial orbital position (in degrees) of orbiting mirror 34 at the beginning of a sweep, NP = the number of timing pulses 278 since the last trigger pulse 284, and OD = the number of orbital degrees covered by the orbiting mirror 34 during each sweep.

Referring again to FIG. 5, the following time periods are depicted:

$t_P$ = the pulse time period which is the duration of the timing pulses 278 caused by tape 78, $t_L$=the leading time period between the initial beam 68 and the leading beam 70, $t_T$=the trailing time period between the initial beam 68 and the trailing beam 72, and $t_S$=the sweep time period between the initial beam 68 of one sweep and the initial beam 76 of the subsequent sweep.

The ratio of $t_L$ to $t_S$ indicates the percentage of a particular sweep that has occurred before leading beam 70 is blocked by object 12. Similarly, the ratio of $t_T$ to $t_S$ indicates the percentage of a sweep that has occurred before trailing beam 70 is unblocked by object 12. Because of the size and position of object 12 selected for this example, $t_L/t_S=½$ during this sweep and $t_T/t_S=¾$. By multiplying each of the above ratios by the number of orbital degrees OD traveled during each sweep and adding this product to the initial orbital position IOP, the orbital positions OP of orbiting mirror 34 when leading beam 70 and trailing beam 72 are produced can be calculated as summarized by the following formulas:

$$OP_L = [(t_L/t_S) \times OD] + IOP$$
$$= [(t_L/t_S) + NP] \times [360°/(RT \times NF)]$$
$$OP_T = [(t_T/t_S) \times OD] + IOP$$
$$= [(t_T/t_S) + NP] \times [360°/(RT \times NF)]$$

where:

$OP_L$=the orbital position of orbiting mirror 34 when leading beam 70 is produced (in degrees measured clockwise from the 12 o'clock position), $OP_T$=the orbital position of orbiting mirror 34 when trailing beam 72 is produced (in degrees measured clockwise from the 12 o'clock position), $t_L$=the leading time period between the initial beam 68 and the leading beam 70, $t_T$=the trailing time period between the initial beam 68 and the trailing beam 72, $t_S$=the sweep time period between the initial beam 68 of one sweep and the initial beam 76 of the subsequent sweep, NP=the number of timing pulses 278 since the last trigger pulse 284, RT=the ratio of the diameter of internal gear 52 to the diameter of pinion 50, and NF=the number of facets 46 on orbiting mirror 34.

In this example, $OP_L=195°$ and $OP_T=202½°$. In addition to calculating the orbital position of orbiting mirror 34 for each leading beam 70 and trailing beam 72, the rotational orientation is also determined in a similar fashion as described below.

Referring to FIG. 7, a sweep angle SA is defined as the number of degrees subtended by the initial beam 68 and the final beam 74 (assuming for the moment that tape 78 has a width of zero.) Sweep angle SA is calculated by the following formula:

$$SA=[(RT-C)/(RT \times NF)] \times 360°$$

where:

SA=sweep angle subtended by the initial beam 68 and the final beam 74 of every sweep (in degrees), RT=the ratio of the diameter of internal gear 52 to the diameter of pinion 50, C = 1 when scanning beam moves in the same direction as orbiting mirror 34 (as shown in FIG. 3),
= −1 when scanning beam moves in the opposite direction (not shown) as orbiting mirror 34, such as when an idler gear (not shown) is used between pinion 50 and internal gear 52, or when pinion 50 is used in conjunction with an external gear (not shown), and NF = the number of facets 46 on orbiting mirror 34.

In this example, the sweep angle SA is 90°.

The rotational orientation of orbiting mirror 34 is determined by multiplying the respective ratio $t_L/t_S$ or $t_T/t_S$ by the sweep angle SA and subtracting this product from the angle of the initial beam 68. The angle of the initial beam is equal to the angle of the initial orbital position IOP, plus 180°, plus half of the orbital degrees OD per sweep, plus half of the sweep angle SA. This is summarized by the following formulas:

$$RO_L = (IOP + 180° + OD/2 + SA/2) - (SA \times t_L/t_S)$$
$$= (\{[2NP + (1 - 2t_L/t_S)(RT - 1) + 1]/$$
$$(RT \times NF)\} + 1) \times 180$$
$$RO_T = (IOP + 180° + OD/2 + SA/2) - (SA \times t_T/t_S)$$
$$= (\{[2NP + (1 - 2t_T/t_S)(RT - 1) + 1]/$$
$$(RT \times NF)\} + 1) \times 180$$

where:

$RO_L$=the rotational orientation of orbiting mirror 34 when leading beam 70 is produced (in degrees measured clockwise from the 12 o'clock position), $RO_T$=the rotational orientation of orbiting mirror 34 when trailing beam 72 is produced (in degrees measured clockwise from the 12 o'clock position), $t_L$=the leading time period between the initial beam 68 and the leading beam 70, $t_T$=the trailing time period between the initial beam 68 and the trailing beam 72, $t_S$=the sweep time period between the initial beam 68 of one sweep and the initial beam 76 of the subsequent sweep, NP=the number of timing pulses 278 since the last trigger pulse 284, RT=the ratio of the diameter of internal gear 52 to the diameter of pinion 50, and NF=the number of facets 46 on orbiting mirror 34.

In this example, $RO_L=15°$ and $RO_T=352½°$.

In summary, the preferred method involves extracting the values for $t_L$, $t_T$, $t_S$, and NP from electrical signal 80 for each sweep in each orbit. The values for RT and NF are predetermined by the mechanical configuration of apparatus 10. These five values are used to calculate the orbital position and rotational orientation of the leading beam 70 and the trailing beam 72, $OP_L$, $OP_T$, $RO_L$, and $RO_T$, respectively, for each sweep in each orbit. (A "look-up" table may be utilized so that these values do not have to be directly calculated over and over with the formulas above.) These four values for each sweep can then be used to determine the perimeter of object 12 for each orbit, as will next be described.

Referring to FIGS. 8 and 9, a method for graphically reconstructing the perimeter of object 12 is shown. Leading lines 86 represent the leading beams 70 of each sweep.

Subscripts associated with leading lines 86 refer to the sweep number in an orbit. Continuing with the above example, there are twelve sweeps per orbit. Trailing lines (not shown) are constructed in a similar fashion, but are not shown or described for greater clarity and brevity.

Referring now to just FIG. 8, tracking beam path 62' is constructed with the same radius as that of the actual tracking beam path 62. Leading line 86$_7$ (representing the leading beam 70 of the seventh sweep shown in FIG. 3) is constructed by establishing a starting point 88$_7$ on tracking beam path 62' at an orbital position OP that is OP$_{L7}$ degrees clockwise from 12 o'clock, where OP$_{L7}$ is calculated for the leading beam 70 of the seventh sweep with the formula given above. The rotational orientation RO is also calculated for the leading beam 70 of the seventh sweep as described above, and the resulting value RO$_{L7}$ is used to establish the direction of leading line 86$_7$, as shown in FIG. 8. This process is repeated to construct leading line 86$_8$, so that its intersection 90$_7$ with leading line 86$_7$ is established. In a similar fashion, leading line 86$_9$ is constructed to establish intersection 90$_8$.

Referring to FIG. 9, the process described in the preceding paragraph is carried out for all twelve sweeps in the orbit. The cross-section of object 12 is approximated by the line segments joining intersections 90$_1$ through 90$_{12}$ (not labeled). The area of the cross-section can then be calculated by methods well known in the art. The resolution can be increased by geometrically inscribing curve 91 within the line segments, and/or by increasing the number of sweeps per orbit by increasing ratio RT. Preferably, apparatus 10 is configured to have a ratio RT of at least 8, so that with three facets 46 on orbiting mirror 34, there will be at least 24 sweeps per orbit. (Increasing the number of facets NF will also increase the resolution by increasing the number of sweeps per orbit, but will decrease the maximum size of object that can be fully measured with a given size apparatus 10 because the sweep angle SA will be decreased.)

Referring to FIGS. 2, 8 and 9, after each orbit made by orbiting mirror 34 around object 12, ring assembly 16 is indexed in the longitudinal direction shown by arrow A in FIG. 2. Successive cross-sections can be geometrically combined by methods well known in the art to determine the total surface topography and volume of object 12. Alternatively, ring assembly 16 can be continuously moved longitudinally while orbiting mirror 34 orbits object 12, resulting in a helical path (not shown) defined by successive intersections 90 (shown in FIG. 8) and which represents the surface of object 12.

In some measurement applications, utilizing trailing lines (not shown) in addition to leading lines 86 in calculating cross-sections will provide redundant information and therefore need not be used. However, this information can be used to verify information provided by leading lines 86. This information can also be used to increase the scanning speed and/or scanning resolution. For instance, when continuously moving ring assembly 16 simultaneously with orbiting mirror 34, a double helix defining the surface of object 12 can be produced when used the information provided by both leading lines 86 and trailing lines. This configuration allows ring assembly 16 to move twice as fast in the longitudinal direction for the same resolution. The extra information provided by trailing lines is also useful when radial beam 28 and/or tracking beam 32 is blocked during portions of each orbit (not shown). Intermittent beam blockage might be necessary if the apparatus is configured with all of the optics below pinion 50 (inverted from configuration shown in FIG. 2). In such a configuration, a structure (not shown) for supporting object 12 would be located between axis mirror 26 and object 12, and would block radial beam 28 and/or tracking beam 32 during predetermined portions of each orbit. Radial beam 28 blockage also occurs in a second embodiment, which will be described later.

Referring to FIG. 10, the electrical and software portions of the measuring apparatus will be described. Detector 44 can be a simple phototransistor, or a photodiode, such as part number SD 100-11-21-021 manufactured by Advanced Photonix, Inc., Camarillo, Calif. In the preferred embodiment, detector 44 is voltage biased and its output is amplified by an operational amplifier 92 to produce a voltage that is proportional to the amount of light striking detector 44. Sensor 84 (for detecting the orbit of orbiting mirror 34) can be a Hall-effect sensor positioned to detect shaft rotation in the drive train (not shown) of the apparatus 10.

In the preferred embodiment, the opto-mechanical portion 10 of the apparatus is controlled by a personal computer 94, such as an IBM compatible PC, XT or AT. Signals 80' and 82 from detector 44 and sensor 84, respectively, are input to computer 94 through expansion slot acquisition card 96, such as a digital oscilloscope card, model CompuScopeLITE from Gage Applied Sciences Inc., Montreal, Canada. Acquisition card 96 converts the voltage signals 80 and 82 from analog to digital, and stores the resulting discrete voltage values for each successive, pre-determined increment of time in on-board memory (not shown). The CompuScopeLITE is capable of acquiring at least 20 million samples per second. Acquisition software 98, such as the GageScope program that ships with the CompuScopeLITE, is used to initiate the acquisition of signals 80 and 82 and to save the digital data representing these signals in storage 100, such as the computer's random access memory or hard drive. Proprietary data analysis software 102 retrieves the data saved in storage 100 and performs the calculations outlined above. The operations of acquisition card 96, acquisition software 98, storage 100, and data analysis software 102 are managed by propriety control software 104. Control software 104 directs data analysis software 102 to calculate the size, shape, position, orientation, area, volume, surface topography, specific volume, and/or other such parameters of object 12, and if desired, the change of these parameters since object 12 was last measured. This information is then displayed numerically and/or graphically on computer monitor 106, and can be saved in storage 100 for further analysis or use.

A user can control the operation of the system from computer keyboard 108 and from user controls 110 located on the opto-mechanical portion 10 of the system. Input/ Output (I/O) card 112, such as model number PCL-724 from American Advantech Corp., Sunnyvale, Calif., can be used in an expansion slot (not shown) of computer 94 and be directly controlled by control software 104. Through I/O card 112, control software 104 can control the operation of beam generator 18, and motor(s)/clutch 114 that drive orbiting mirror 34, tracking arm 54 and ring assembly 16. Control software 104 can also receive digital input and interrupts through I/O card 112 from home sensor 116 (for determining the vertical position of ring assembly 16), and other sensors 118 (such as a scale (not shown) to provide the weight of object 12 so that its specific volume can be calculated by data analysis software 102.)

In initial development and in low quantities, the data analysis software 102 and control software 104 is written in a simple language, such as BASIC. However, for lower system cost and increased performance, it is envisioned that the functions of acquisition card 96 and I/O card 112 will be accomplished by a single card (either a standard acquisition/control card or custom designed board), and that acquisition software 98, data analysis software 102 and control software 104 will be combined into a single piece of proprietary assembly language which will provide a more sophisticated user interface and improved operation. This will also allow longer scans to be processed on the fly, rather than having to be stored on the computer's hard drive and later retrieved for analysis after object 12 has been scanned. For further size and cost reduction, computer 94 can be eliminated and all data acquisition, processing, control and display can be accomplished by custom circuitry built into the opto-mechanical portion 10 of the apparatus.

Referring to FIG. 11, a non-ideal or actual electrical signal 80' is shown, corresponding to the ideal signal 80 shown in FIG. 5 (which is shown subimposed as a dashed line in FIG. 11). The square-cornered wave shape (i.e. either ON or OFF) of the ideal signal 80 is "created" from the actual signal 80' before data analysis software 102 locates the timing pulses 278 and measures the values for $t_L$, $t_T$, $t_S$, and NP (shown in FIG. 5) for each sweep. This can be accomplished by using wave shaping circuitry (not shown), well known in the art, applied to signal 80 before it is received by acquisition card 96. Alternatively, since signal 80' is saved as digital information in storage 100, data analysis software 102 can perform this function, although this may increase the time required to process the scan information and the space in storage 100 required to store the information. Data analysis software 102 can shape actual signal 80' by selecting a threshold voltage value 120 below signal 80' features 122 and 126, which are described in the following paragraphs. Also, long term signal drift or change (not shown), which can be caused by temperature changes in the circuitry or beam generator, by the increase of beam travel distance when ring assembly 16 is moved longitudinally, or by dirty optics, can be compensated for in the data analysis software 102 by taking relative voltage measurements rather than absolute measurements. In other words, these problems can be overcome by setting threshold 120 periodically during analysis as a fixed percentage of the difference between local maximums and minimums in signal 80', rather than by having a preset, constant threshold 120. Rise and fall times of the Advanced Photonix detector 44 listed above are on the order of 10 nanoseconds and are therefore negligible.

In the preferred embodiment, retroreflective surface 38 (shown in FIGS. 2 and 3) is created by applying a self-adhesive retroreflective tape, such as catalog number 198 from 3M Consumer Stationery Division, Saint Paul, Minn. Such a tape contains tiny cube corners which exhibit the well known property of reflecting light back along its incident direction. However, as the attack angle between an incident scanning beam 36 and the normal to the retroreflective tape increases, the efficiency of the retroreflective tape (i.e. the amount of light retroreflected by it) decreases. This creates a dome shaped signal 80' during each sweep of scanning beam 36, with minimums 122 coinciding with both the initial beam 68 and the final beam 74, and a maximum 124 coinciding with the leading beam 70 shown in the example of FIG. 3. As mentioned in the preceding paragraph, threshold 120 should be set below dome minimums 122.

Due to beam spread after scanning beam 36 is reflected by retroreflective surface 38, rounded corners 126 occur on signal 80' coincident with the leading beam 70 and trailing beam 72 (shown in FIG. 3). When the incident scanning beam 36 passes by object 12, its diameter is on the order of 1 millimeter, whereas the diameter of the retroreflected scanning beam 36 is on the order of at least a centimeter when it returns past object 12. Since the return scanning beam 36 is approximately halfway eclipsed by object 12 when the incident scanning beam 36 is first blocked by object 12, rounded corners 126 drop signal 80' to about half its normal voltage at points 270 and 272, corresponding to leading beam 70 and trailing beam 72, respectively. Another cause of the rounded corner phenomenon is body hair when object 12 is a person. Again, threshold 120 should be set below rounded corners 126.

Referring to FIGS. 11 through 15, a third phenomenon created by retroreflective surface 38 is depicted by spike 128 in FIG. 11. Spike 128 occurs in the middle of each sweep if retroreflective surface 38 is oriented normal to scanning beam 36 (i.e. oriented vertically in this embodiment, as shown in FIG. 14.) This is due to beam 36 being partially reflected by the shiny surface of the retroreflective tape, in addition to being partially retroreflected by the cube corners within the tape. During the majority of each sweep, this supplemental reflection 130 does not directly return to orbiting mirror 34, as shown in FIG. 12. However, when scanning beam 36 strikes the shiny retroreflective surface 38 perpendicularly, as shown in FIGS. 13 and 14, supplemental reflection 130 returns to detector 44 (not shown) through orbiting mirror 34, and causes spike 126, shown in FIG. 11. To eliminate this problem, retroreflective surface 38 should be angled, as shown in FIG. 15. The angle 132 of retroreflective surface 38 should be large enough to prevent supplemental reflections 130 from striking orbiting mirror 34. A greater angle 132 also reduces unwanted secondary retroreflections 134 caused by supplemental reflection 130 striking retroreflective surface 38 and being partially retroreflected itself, shown at point 136 in FIG. 12. However, angle 132 shown in FIG. 15 should not be so great as to significantly reduce the amount of light that is primarily retroreflected as the return scanning beam 36 from retroreflective surface 38 to orbiting mirror 34. Therefore, some experimentation with angle 132 is beneficial to find an optimal angle dependant on the characteristics of a particular retroreflective surface and apparatus configuration.

Referring to FIG. 4, elevation lines 138 depict points of constant elevation on one of the facets 46. Because orbiting mirror 34 is pyramidical in shape, the outer edges are lower than the center. It can be seen that relative path 64 of tracking beam 32 crosses several elevation lines 138. This means that scanning beam 36 changes in elevation during each sweep, starting and finishing higher than during the middle of each sweep. The introduction of elevation error can be compensated for in the data analysis software 102 (not shown) by numerically adjusting the current height of ring assembly 16 (not shown) as a function of the rotation angle of orbiting mirror 34. Alternatively, spacing S (i.e. the size of orbiting mirror 34) can be reduced until this elevation error is negligible.

Referring to FIGS. 16 and 17, discontinuous or multiple cross-sections, such as of the torso 12-T and arms 12-A, 12-A of a person represented in FIG. 16, can also be measured by the inventive apparatus in a similar fashion to that described above. Leading beams $70_1$, $70_2$, and $70_3$, are produced and measured for each separate portion 12-A, 12-T, and 12-A, respectively, of the cross-section. Similarly, trailing beams $72_1$, $72_2$, and $72_3$, are produced and measured for each separate portion. FIG. 17 shows an ideal electrical signal 80 corresponding to the example sweep in FIG. 16. Non-reflective tape 78 (not shown) on orbiting mirror 34 (not shown) may have to be a particular width to help distinguish timing pulses 278 from blockage pulses such as 212-A caused by object 12. Leading time periods $t_{L1}$, $t_{L2}$, and $t_{L3}$ are measured by data analysis software 102 (not shown), as previously described, for each separate portion 212-A, 212-T, and 212-A, respectively of signal 80. Similarly, trailing time periods $t_{L1}$, $t_{L2}$, and $t_{L3}$ are also measured for each separate portion.

Referring to FIG. 18, the location of leading lines 86 corresponding to leading beams 70, and trailing lines 140 corresponding to trailing beams 72 can be calculated for each sweep, as previously described. FIG. 18 shows the leading lines $86_1$, $86_2$, and $86_3$, and trailing lines $140_1$, $140_2$, and $140_3$ that would result from the example sweep of FIGS. 16–17, and also shows leading line $86_4$ and trailing line $140_4$ that would result from another sweep occurring around the 3 o'clock position. Rather than calculating the intersections 90 (not shown) between these lines as previously described, an alternative method may be employed for discontinuous or multiple cross-sections. Lines 86 and 140, and circle 62, define vectors 142 where scanning beam 36 remained unblocked during a sweep. Vectors 142 are shaded in FIG. 18. By calculating vectors 142 for all the sweeps in an orbit (only two representative sweeps are shown in FIG. 18), the area within circle 62 not containing object 12 can be defined. Almost the entire cross-section of object 12 can thereby be outlined by vectors 142, and then curves 91 accurately representing the cross-section can then be inscribed inside the outline.

As with contiguous cross-sections, it is preferable to have the entire object being measured well within circle 144 which is defined by all of the initial beams 68 and final beams 74 of a complete orbit (not shown). The radius r of circle 144 is given by the following formula:

$$r = R \times \sin[360°/(2 \times NF)]$$

where:

r=the radius of circle 144 (or cylinder) which object 12 should fit within,

R=the radius of tracking beam path 62, and

NF=the number of facets 46 on orbiting mirror 34

Referring to FIG. 19, concave curves lying within a lateral cross-section of object 12' are not directly detected by scanning beam 36. FIG. 20 shows the resulting geometry 91 that would be calculated by the data analysis software 102 (not shown). If the human body is the object being measured, this may introduce unacceptable errors when measuring such areas as the head, armpits, breasts, buttocks, hands and feet. Concave depth 146 can be entered or approximated in the analysis in a number of ways. A chiropractic body alignment or a relative change in volume (or specific volume/fat content) may be all that is sought, rather than an entire mapping of the body's topography or an absolute volume. In this case concave features need not be determined, unless significant changes are suspected within the concave surfaces. Concave depths 146 can be approximated based on other features measured by scanning beam 36 and/or based on empirical data. These types of approximations can be done for each concave surface, or a single factor can be applied to the entire body volume. Alternatively or in addition, the first measurement of an individual can be "calibrated" by using traditional measurement techniques, such as weighing the person under water. Another option is to use other measurement techniques, such as by using a depth gauge 148, and enter concave depths 146 manually through keyboard 108 (not shown) or automatically with electronic gauges. To assist the user in taking manual measurements, the apparatus can be configured to "point" to the desired measurement location, either with a graphical representation of the person on monitor 106 (not shown), or directly on the person's body with scanning beam 36. If the object being measured is not a human body, it may be possible to orient concave features so that they lie only in a plane parallel to the central axis 14 of the apparatus (shown in FIG. 2), rather than in a lateral plane. For instance, if the object shown in FIG. 19 were of a constant cross-section and were not too long, it could be rotated 90° about horizontal axis 150 so that its entire surface could be reached by scanning beam 36.

The present invention is not limited to measuring opaque objects, but can measure translucent objects as well. For instance, the present invention can be used to check the wall thickness or cleanliness of glass or plastic bottles. Instead of checking only whether scanning beam 36 is blocked or unblocked, the degree of blockage is accurately determined during each sweep.

Referring to FIG. 21, a second embodiment of the present invention will now be discussed. This second embodiment is used to measure long or continuous length objects, such as industrial extrusions, webs, cables, air craft rotor blades or timber. This second embodiment is essentially identical to the first but with two major differences. First, ring assembly 16 carrying orbiting mirror 34 remains stationery while object 12" is moved in the direction of arrow A through an off-center portion of ring assembly 16 (or the entire apparatus 10' is moved longitudinally along object 12".) Second, there is no arm connecting tracking mirror 30 to axis mirror 26. Instead, tracking mirror 30 is positioned directly adjacent to orbiting mirror 34 by tracking arm 54' and orbits around object 12" with orbiting mirror 34.

Object 12" blocks scanning beam 36 once during every sweep as before, but now blocks radial beam 28 once during every orbit, also. As mentioned above, each orbit includes redundant information, so the information that is lost while radial beam 28 is momentarily blocked can be obtained when orbiting mirror 34 orbits the opposite side of object 12". Data analysis software 102 (not shown) can distinguish blockage of radial beam 28 from blockage of scanning beam 36 because during the former, timing pulses 178 (not shown) will be obliterated.

While the present invention is disclosed by reference to the examples and preferred embodiments detailed above, it is to be understood that these embodiments are intended in an illustrative rather than limiting sense, as it is contemplated that modifications will readily occur to those skilled in the art, which modifications will be within the spirit of the invention and the scope of the appended claims.

I claim:

1. An optical scanning apparatus comprising:

a beam source for generating a narrow beam of light;

an orbiting mirror which rotates about its own axis while orbiting around an object to be measured, wherein the orbiting mirror repetitively reflects the beam inwardly across the object in a rotary scanning fashion to produce a plurality of sweeps of a scanning portion of the beam across the object during each orbit; and a beam detector for producing an electrical signal in response to interruptions of the scanning portion by the object, wherein the beam source does not orbit around the object to be measured.

2. An optical scanning apparatus as described in claim 1, further comprising:

means for associating a corresponding orbital position and a corresponding rotational orientation of the orbiting mirror with changes in the electrical signal, thereby allowing to be defined a plurality of tangents to a surface of the object; and means for assimilating the tangents to calculate the location of at least a portion of the object's surface.

3. An optical scanning apparatus comprising:

a beam source for generating a narrow beam of light, the beam having a axial portion generally aimed at an object to be measured;

tracking means for producing a tracking portion of the beam parallel to the axial portion and radially offset therefrom, wherein the tracking portion revolves around the object and about an axis through the axial portion;

an orbiting mirror which rotates about its own axis while orbiting around the object in synchronization with the tracking portion, wherein the orbiting mirror repetitively reflects the tracking portion inwardly across the object in a rotary scanning fashion to produce a plurality of sweeps of a scanning portion of the beam across the object during each orbit;

a beam detector for producing an electrical signal in response to interruptions of the scanning portion by the object;

means for associating a corresponding orbital position and a corresponding rotational orientation of the orbiting mirror with changes in the electrical signal, thereby allowing to be defined a plurality of tangents to the surface of the object; and means for assimilating the tangents to calculate the location of at least a portion of the object's surface.

4. An optical measuring apparatus as described in claim 3, wherein the axial and tracking portions of the beam are generally parallel to a longitudinal axis of the object being measured, and the plurality of sweeps of the scanning portion of the beam lie in a plane perpendicular to the longitudinal axis so that the apparatus calculates a cross-section of the object's surface in the perpendicular plane.

5. An optical measuring apparatus as described in claim 4, further comprising means for moving the relative longitudinal position between the scanning portion of the beam and the object, thereby allowing successive cross-sections to be calculated and assimilated to produce a three-dimensional representation of the object's surface.

6. An optical measuring apparatus as described in claim 3, further comprising a retroreflective surface at least partially encircling the object such that it receives the scanning portion of the beam that is not interrupted by the object and returns the beam substantially along its incident path back to the orbiting mirror, along the tracking portion to the tracking means, and then back along the axial portion to the detector.

7. An optical measuring apparatus as described in claim 3, wherein the orbiting mirror is multifaceted, further wherein each facet in succession creates a single sweep of the scanning portion of the beam as the orbiting mirror rotates in relation to the tracking portion.

8. An optical measuring apparatus as described in claim 3, wherein the orbiting mirror is a three-sided, 45-degree pyramid, thereby reflecting the tracking portion of the beam through a right angle towards the object to be measured, and creating a scanning portion of the beam which travels no more than 120 degrees per sweep.

9. An optical measuring apparatus as described in claim 3, wherein the tracking means further comprises:

an axis mirror for reflecting the axis portion of the beam through a right angle to form a radial portion of the beam, wherein the axis mirror rotates about the axis through the axial portion causing the radial portion to continuously sweep around 360 degrees; and a tracking mirror radially offset from the axis mirror for reflecting the radial portion through a right angle to form the tracking portion, wherein the tracking mirror revolves around the axis mirror in synchronization therewith and with the orbiting mirror.

10. An optical measuring apparatus as described in claim 9, wherein the axis mirror and the tracking mirror are directly connected together.

11. An optical measuring apparatus as described in claim 9, wherein the axis mirror and the tracking mirror are not directly connected together and the object being measured passes between the axis mirror and the tracking mirror every orbit.

12. A method for optically scanning an object comprising the steps of:

orbiting a mirror around an object to be measured;

rotating the orbiting mirror about its own axis;

generating a narrow beam of light;

tracking the orbiting and rotating mirror with the beam so that the beam follows the mirror as the mirror moves and is reflected off of the mirror inwardly towards an object, creating a rotary scanning beam that repetitively sweeps across an object during each orbit of the mirror; and detecting interruptions of the scanning beam caused by an object.

13. A method for optically scanning an object as described in claim 12 further comprising the steps of:

associating a corresponding orbital position and a corresponding rotational orientation of the mirror with the detected interruptions to define a plurality of tangents to a surface of the object; and assimilating the tangents to calculate the location of at least a portion of the object's surface.

14. A method for optically scanning an object as described in claim 13 further comprising the steps of:

calculating a cross-section of the object after assimilating the tangents produced during one orbit of the mirror;

moving the relative longitudinal position between the rotary scanning beam and the object;

repeating the calculating and moving steps to gather a succession of cross-sections along a longitudinal axis of the object; and combining the succession of cross-sections to calculate a three-dimensional representation of the object's surface.

15. A method for optically scanning an object as described in claim 12 further comprising the step of:

pointing to a location that is to be measured manually on the object by positioning the mirror so that the reflected beam illuminates the location on the object.

16. A method for optically scanning an object as described in claim 12 further comprising the steps of:

retroreflecting segments of the scanning portion of the beam that are not interrupted by the object back to the orbiting mirror along an incident path.

17. A method for optically scanning an object comprising the steps of:

orbiting a mirror around an object to be measured;

rotating the orbiting mirror about its own axis;

generating a narrow beam of light;

producing an axial portion of the beam generally aligned with a longitudinal axis of an object to be measured;

producing a tracking portion of the beam from the axial portion, wherein the tracking portion is parallel to the axial portion and is radially offset therefrom, and wherein the tracking portion revolves around the object and about an axis through the axial portion;

tracking the orbiting and rotating mirror with the tracking portion of the beam so that the tracking portion is reflected off of the mirror inwardly towards an object, creating a rotary scanning beam that repetitively sweeps across an object during each orbit of the mirror; and detecting interruptions of the scanning beam caused by an object.

18. An optical scanning apparatus comprising:

a beam source for generating a narrow beam of light;

an orbiting mirror which rotates about its own axis while orbiting around an object to be measured, wherein the orbiting mirror repetitively reflects the beam inwardly across the object in a rotary scanning fashion to produce a plurality of sweeps of a scanning portion of the beam across the object during each orbit;

a retroreflective surface located at least partially around the object, the surface producing a retroreflected portion of the beam by returning segments of the scanning portion not interrupted by the object back to the orbiting mirror along an incident path; and a beam detector for receiving the retroreflected portion and producing an electrical signal in response thereto.

19. An optical measuring apparatus as described in claim 18, wherein only a single beam detector is utilized to receive the retroreflected portion of the beam.

20. An optical measuring apparatus as described in claim 18, wherein the beam detector does not orbit around the object to be measured.

* * * * *